United States Patent
Zhao et al.

(10) Patent No.: US 9,800,312 B2
(45) Date of Patent: Oct. 24, 2017

(54) METHOD AND TERMINAL FOR FEEDING BACK CHANNEL STATE INFORMATION

(71) Applicant: ZTE CORPORATION, Shenzhen, Guangdong Province (CN)

(72) Inventors: Jing Zhao, Shenzhen (CN); Yu Ngok Li, Shenzhen (CN); Yijian Chen, Shenzhen (CN); Xun Yang, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 0 days.

(21) Appl. No.: 14/764,584

(22) PCT Filed: Mar. 21, 2014

(86) PCT No.: PCT/CN2014/000314
§ 371 (c)(1),
(2) Date: Jul. 30, 2015

(87) PCT Pub. No.: WO2014/187146
PCT Pub. Date: Nov. 27, 2014

(65) Prior Publication Data
US 2016/0065289 A1 Mar. 3, 2016

(30) Foreign Application Priority Data

May 24, 2013 (CN) .......................... 2013 1 0198968

(51) Int. Cl.
*H04B 7/06* (2006.01)
*H04W 72/04* (2009.01)
*H04L 1/00* (2006.01)

(52) U.S. Cl.
CPC ......... *H04B 7/0626* (2013.01); *H04B 7/0639* (2013.01); *H04L 1/0031* (2013.01);
(Continued)

(58) Field of Classification Search
CPC .... H04B 7/0639; H04B 7/063; H04B 7/0456; H04B 7/0478; H04B 7/065; H04B 7/0658;
(Continued)

(56) References Cited

U.S. PATENT DOCUMENTS

2009/0080549 A1* 3/2009 Khan .................. H04B 7/0417
375/260
2009/0207784 A1* 8/2009 Lee ........................ H04B 7/063
370/328

(Continued)

FOREIGN PATENT DOCUMENTS

CN 101902307 A 12/2010
CN 101969363 A 2/2011

(Continued)

OTHER PUBLICATIONS

3GPP TS 36.213 V12.0.0, Dec. 2013, pp. 1-186.*

(Continued)

*Primary Examiner* — Sophia Vlahos
(74) *Attorney, Agent, or Firm* — Ling Wu; Stephen Yang; Ling and Yang Intellectual Property

(57) ABSTRACT

A method and terminal for feeding back channel state information are applied to a 4-antenna system. The method includes: a terminal acquiring channel state information, the terminal performing joint encoding on PMI1 information and RI information into a 4-bit or 5-bit feedback report, or, performing joint encoding on PMI1 information and PMI2 information into a 4-bit feedback report, or, the PMI2 information using 2-bit feedback; and the terminal feeding back the feedback report in a physical uplink control channel.

14 Claims, 3 Drawing Sheets

A terminal acquires channel state information — S102

▼

The terminal performs joint encoding on the PMI1 information and the RI information into a 5-bit feedback report — S104

▼

The terminal feeds back the feedback report in a physical uplink control channel — S106

(52) U.S. Cl.
CPC ....... *H04W 72/0453* (2013.01); *H04B 7/0636* (2013.01); *H04L 1/0026* (2013.01); *H04L 1/0029* (2013.01)

(58) Field of Classification Search
CPC ... H04B 7/0636; H04B 7/0626; H04L 1/0031; H04L 1/0026; H04L 1/0029
See application file for complete search history.

(56) References Cited

U.S. PATENT DOCUMENTS

| | | | |
|---|---|---|---|
| 2011/0032839 A1* | 2/2011 | Chen | H04B 7/024 370/252 |
| 2011/0142144 A1* | 6/2011 | Allpress | H04B 7/0413 375/259 |
| 2011/0142147 A1 | 6/2011 | Chen et al. | |
| 2011/0243098 A1* | 10/2011 | Koivisto | H04B 7/0482 370/335 |
| 2011/0294527 A1* | 12/2011 | Brueck | H04W 24/02 455/466 |
| 2012/0020288 A1* | 1/2012 | Liu | H04B 7/0417 370/328 |
| 2012/0063500 A1* | 3/2012 | Wang | H04L 1/0026 375/224 |
| 2012/0218948 A1 | 8/2012 | Onggosanusi et al. | |
| 2012/0314590 A1 | 12/2012 | Choudhury et al. | |
| 2013/0039197 A1* | 2/2013 | Pan | H04L 1/0026 370/252 |
| 2013/0064276 A1* | 3/2013 | Kim | H04B 7/063 375/219 |
| 2013/0070720 A1* | 3/2013 | Pan | H04B 7/0626 370/329 |
| 2013/0114655 A1* | 5/2013 | Gomadam | H04L 1/0031 375/219 |
| 2013/0188593 A1* | 7/2013 | Chen | H04B 7/063 370/329 |
| 2013/0188745 A1* | 7/2013 | Wu | H04L 25/03343 375/259 |
| 2014/0254701 A1* | 9/2014 | Geirhofer | H04B 7/0626 375/267 |
| 2014/0328422 A1* | 11/2014 | Chen | H04B 7/0417 375/267 |
| 2014/0362940 A1* | 12/2014 | Yue | H04B 7/0478 375/267 |
| 2015/0381253 A1* | 12/2015 | Kim | H04B 7/0482 370/329 |
| 2016/0006494 A1* | 1/2016 | Yang | H04L 25/0391 370/329 |
| 2016/0065289 A1 | 3/2016 | Zhao | |

FOREIGN PATENT DOCUMENTS

| | | |
|---|---|---|
| CN | 101969367 A | 2/2011 |
| CN | 102468929 A | 5/2012 |
| EP | 2525505 A1 | 11/2012 |
| EP | 2590336 A1 | 5/2013 |
| EP | 2621122 A1 | 7/2013 |
| EP | 2955869 A1 | 12/2015 |
| RU | 2460228 C1 | 8/2012 |
| RU | 2011123902 A | 12/2012 |
| WO | WO2012/079615 * 6/2012 | ............ H04W 24/10 |
| WO | 2014187146 A1 | 11/2014 |

OTHER PUBLICATIONS

ZTE; Consideration on Signaling for Two-component Feedback; 3GPP TSG RAN WG1 Meeting #62; Madrid, Spain, Aug. 23-27, 2010; R1-104558.

* cited by examiner

METHOD AND TERMINAL FOR FEEDING BACK CHANNEL STATE INFORMATION

TECHNICAL FIELD

The present invention relates to the field of communications, and in particular, to a method and terminal for feeding back channel state information.

BACKGROUND OF THE RELATED ART

In a wireless communication system, a transmitting terminal and a receiving terminal acquire a higher rate by means of spatial multiplexing and using multiple antennas. Compared with a common spatial multiplexing method, an enhanced technology is that the receiving terminal feeds back channel information to the transmitting terminal, and the transmitting terminal uses some transmission precoding technologies according to the acquired channel information, which largely enhances the transmission performance. In single-user Multi-input Multi-output (MIMO), the channel characteristic vector information is directly used for precoding; and in multi-user MIMO, relatively accurate channel information is needed.

In a Long Term Evolution (LTE) plan, the channel information is primarily fed back using a relatively simple single-codebook feedback method, while the performance of the transmission precoding technology for MIMO is more dependent on the accuracy of the codebook feedback therein.

The basic principle of the channel information quantization feedback based on a codebook will be set forth briefly as follows.

It is assumed that the limited feedback channel capacity is B bps/Hz, and then the number of available codewords is $N=2^B$. After quantization, the characteristic vector space of the channel matrix forms a codebook space $\Re = \{F_1, F_2 \ldots F_N\}$. The transmitting terminal and the receiving terminal jointly store or generate the codebook in real time (the same for the receiving terminal and the transmitting terminal). According to the channel matrix H obtained by the receiving terminal, the receiving terminal selects a codeword $\hat{F}$ which best matches the channel from $\Re$ according to a certain criterion, and feeds back a serial number i of the codeword to the transmitting terminal. The serial number of the codeword is referred to as a Precoding Matrix Indicator (PMI) here. The transmitting terminal finds a corresponding precoding codeword $\hat{F}$ according to the serial number i, so as to obtain the channel information, wherein $\hat{F}$ represents characteristic vector information of the channel.

Generally, $\Re$ may be divided into multiple codebooks corresponding to Ranks, and each Rank correspond to multiple codewords, to quantize the precoding matrix formed by the channel characteristic vectors under the Rank. In general, there will be N columns in a codeword when Rank is N. Therefore, the codebook $\Re$ may be divided into multiple sub-codebooks according to different Ranks, as shown in table 1.

TABLE 1

| $\Re$ | | | |
|---|---|---|---|
| Number of layers υ (Rank) | | | |
| 1 | 2 | … | N |
| $\Re_1$ | $\Re_2$ | … | $\Re_N$ |
| the set of codeword vectors when the number of columns is 1 | the set of codeword matrixes when the number of columns is 2 | | the set of codeword matrixes when the number of columns is N |

Wherein, when Rank>1, the codewords required to be stored are in a form of matrix, wherein such codebook quantization feedback method is used for the codebook in the LTE protocol. The codebook for 4 transmission antennas in the downlink for the LTE is shown in table 2. In practice, in the LTE, the precoding codebook has the same meaning as the channel information quantization codebook. In the following, for the purpose of uniformity, the vector may also be considered as a matrix with a dimension of 1.

TABLE 2

| Codeword index | $u_n$ | Total number of layers υ (RI) | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Wherein, $W_n = I - 2u_n u_n^H / u_n^H u_n$ in which I is a unit matrix, and $W_k^{(j)}$ represents a vector in the $j^{th}$ column of the matrix $W_k$. $W_k$. $W_k^{(j_1, j_2, \cdots j_n)}$ represents a matrix formed by $j_1, j_2, \ldots, j_n$ columns of the matrix $W_k$.

The principle of the codebook feedback technology in the LTE is introduced above. In applications, some more specific feedback methods will be further referred. Firstly, a feedback granularity of the channel information will be introduced. In the LTE standard, the minimum feedback unit of channel information is subband channel information, and one subband is composed of a number of Resource Blocks (RBs). Each RB is composed of a number of Resource Elements (REs), and RE is a minimum unit of time frequency resources in the LTE. In the LTE-A, the resource representation method of the LTE continues to be used. A few Subbands may be referred to as Multi-Subband, and many Subbands may be referred to as Wideband. The feedback contents related to the channel information in the LTE will be described below. The feedback of the channel state information includes Channel Quality Indication (CQI for short) information, PMI and a Rank Indicator (RI for short). The CSI contents which are mostly concerned here are PMI information; however, both the RI and the CQI belong to the contents of the feedback of the channel state information. The CQI is an index for measuring whether the quality of the downlink channel is good. In the 36-213 protocol, the CQI is represented by integer values of 0-15, which represent different CQI levels respectively, and different CQIs correspond to respective Modulation and Coding Schemes (MCSs). The RI is used to describe the number of available spatial independent channels, which corresponds to the Rank of the channel response matrix. In the Open-loop spatial multiplexing and closed-loop spatial multiplexing modes, the UE needs to feed back the RI information, and in other modes, there is no need to feed back the RI information. The rank of the channel matrix corresponds to the number of layers.

Some mechanisms related to the channel information feedback in the LTE will be further described. There are two types of feedback modes for uplink channel information in the LTE, i.e., periodic channel information feedback in the Physical Uplink Control Channel (PUCCH) and periodic/aperiodic channel information feedback in the Physical Uplink Shared Channel (PUSCH). The PUCCH is a control channel, which has relatively high feedback reliability. However, the feedback resources thereof are relatively valuable, and the feedback overhead thereof is strictly limited. In general, the amount of CSI feedback in one feedback report (including one or more of PMI, CQI, and RI) can not exceed 11 bits; and if the amount of CSI feedback exceeds 11 bits, it will cause a sudden reduction in the performance. The PUSCH may provide relatively more CSI feedback resources; however, the reliability cannot be ensured, and it will influence the transmission of the data services since the resources for data transmission are to be occupied.

The Long Term Evolution Advanced (LTE-A) system, as an evolved standard of the LTE, supports a larger system bandwidth (up to 100 MHz), and is backward compatible with LTE related standards. In order to obtain higher average spectrum efficiency of a cell and improve the coverage and throughput of a cell edge, on the basis of the related LTE system, the LTE-A proposes some feedback enhancement technologies in terms of codebook feedback, which primarily enhance the feedback accuracy of the codebook and compress the overhead using the time correlation and/or frequency domain correlation of the channel information. The technology can enhance the spectrum utilization of the International Mobile Telecommunications-Advance (IMT-Advance) and relieve the shortage of spectrum resources. At the same time, in consideration that a more typical application is dual polarization, the enhancement of the codebook also takes a full consideration of the features of the dual polarization channel. The principle idea of the feedback technology of enhanced codebook increases the overhead of the PMI feedback compared to the feedback in the LTE, and the channel state information is represented jointly by feedback of two PMIs in two implementation ways primarily.

The dual-PMI feedback is defined, and the idea of the feedback way may be described as follows.

1) The precoding/feedback structure of one subband is jointly determined by feedback information of two PMI and corresponding codebooks. 2) The codebook is known previously by both the base station and the UE at the same time. The codewords corresponding to the feedback of the PMI may change at different times and in different subbands. 3) One PMI indicates the attributes of a wideband or a long-term channel. The other PMI indicates attributes of a subband or a short-term channel. 4) One matrix may be a fixed matrix, without feedback. At this time, it is equivalent to degenerate to single-PMI feedback (which may be used in cases of high-rank and low-rank uncorrelated channels).

It can be seen that a new structure based on dual-PMI feedback is proposed in terms of channel information feedback. For Rank=r, wherein r is an integer, the difference from the previous 4Tx codebook is that when single-codebook feedback equivalent to the dual-codebook is used, the feedback of the codewords in the corresponding codebook needs the feedback of two PMIs to represent the information thereof. The single codebook equivalent to the dual codebooks may generally be represented as the following table 3.

TABLE 3

| | $i_2$ | | | |
|---|---|---|---|---|
| $i_1$ | 0 | 1 | ... | N2 |
| 0 | $W_{i_1,i_2}$ | $W_{i_1,i_2}$ | $W_{i_1,i_2}$ | $W_{i_1,i_2}$ |
| 1 | $W_{i_1,i_2}$ | $W_{i_1,i_2}$ | $W_{i_1,i_2}$ | $W_{i_1,i_2}$ |
| 2 | $W_{i_1,i_2}$ | $W_{i_1,i_2}$ | $W_{i_1,i_2}$ | $W_{i_1,i_2}$ |
| 3 | $W_{i_1,i_2}$ | $W_{i_1,i_2}$ | $W_{i_1,i_2}$ | $W_{i_1,i_2}$ |
| ... | $W_{i_1,i_2}$ | $W_{i_1,i_2}$ | $W_{i_1,i_2}$ | $W_{i_1,i_2}$ |
| N-1 | $W_{i_1,i_2}$ | $W_{i_1,i_2}$ | $W_{i_1,i_2}$ | $W_{i_1,i_2}$ |
| N1 | $W_{i_1,i_2}$ | $W_{i_1,i_2}$ | $W_{i_1,i_2}$ | $W_{i_1,i_2}$ |

Here, $W_{i_1,i_2}$ is a codeword jointly indicated by $i_1$ and $i_2$, and may generally be written into a function form $W(i_1,i_2)$, and there is only a need to determine $i_1$ and $i_2$. For example, when r=1, as shown in Table 4, illustrated is a codebook corresponding to LTE-A Rel12 rank1.

TABLE 4

| $i_1$ | $i_2$ | | | | | | | |
|---|---|---|---|---|---|---|---|---|
| | 0 | 1 | 2 | 3 | 4 | 5 | 6 | 7 |
| 0-15 | $W_{i_1,0}^{(1)}$ | $W_{i_1,1}^{(1)}$ | $W_{i_1,2}^{(1)}$ | $W_{i_1,3}^{(1)}$ | $W_{i_1+8,0}^{(1)}$ | $W_{i_1+8,1}^{(1)}$ | $W_{i_1+8,2}^{(1)}$ | $W_{i_1+8,3}^{(1)}$ |

| $i_1$ | $i_2$ | | | | | | | |
|---|---|---|---|---|---|---|---|---|
| | 8 | 9 | 10 | 11 | 12 | 13 | 14 | 15 |
| 0-15 | $W_{i_1+16,0}^{(1)}$ | $W_{i_1+16,1}^{(1)}$ | $W_{i_1+16,2}^{(1)}$ | $W_{i_1+16,3}^{(1)}$ | $W_{i_1+24,0}^{(1)}$ | $W_{i_1+24,1}^{(1)}$ | $W_{i_1+24,2}^{(1)}$ | $W_{i_1+24,3}^{(1)}$ |

Wherein, $W_{m,n}^{(1)} = \frac{1}{\sqrt{2}} \begin{bmatrix} v_m \\ e^{j\frac{n\pi}{2}} \cdot e^{j\frac{m\pi}{8}} v_m \end{bmatrix}$, $v_m = [\, 1 \quad e^{j2\pi m/32}\,]^T$ When r=2, a candidate codebook Option a, as shown in Table 5-a, is a first codebook corresponding to LTE-A Rel12 rank2.

TABLE 5-a

| $i_1$ | $i_2$ | | | |
|---|---|---|---|---|
| | 0 | 1 | 2 | 3 |
| 0-15 | $W_{i_1,i_1,0}^{(2)}$ | $W_{i_1,i_1,1}^{(2)}$ | $W_{i_1+8,i_1+8,0}^{(2)}$ | $W_{i_1+8,i_1+8,1}^{(2)}$ |

| $i_1$ | $i_2$ | | | |
|---|---|---|---|---|
| | 4 | 5 | 6 | 7 |
| 0-15 | $W_{i_1+16,i_1+16,0}^{(2)}$ | $W_{i_1+16,i_1+16,1}^{(2)}$ | $W_{i_1+24,i_1+24,0}^{(2)}$ | $W_{i_1+24,i_1+24,1}^{(2)}$ |

TABLE 5-a-continued

| $i_1$ | $i_2$ | | | |
|---|---|---|---|---|
| | 8 | 9 | 10 | 11 |
| 0-15 | $W_{i_1,i_1+8,0}^{(2)}$ | $W_{i_1,i_1+8,1}^{(2)}$ | $W_{i_1+8,i_1+16,0}^{(2)}$ | $W_{i_1+8,i_1+16,1}^{(2)}$ |

| $i_1$ | $i_2$ | | | |
|---|---|---|---|---|
| | 12 | 13 | 14 | 15 |
| 0-15 | $W_{i_1,i_1+24,0}^{(2)}$ | $W_{i_1,i_1+24,1}^{(2)}$ | $W_{i_1+8,i_1+24,0}^{(2)}$ | $W_{i_1+8,i_1+24,1}^{(2)}$ |

Wherein, $W_{m,m',n}^{(2)} = \frac{1}{2} \begin{bmatrix} v_m & v_{m'} \\ \varphi_n v_m & -\varphi_n v_{m'} \end{bmatrix}$, $\phi_n = e^{j\pi n/2}$, $v_m = [\, 1 \quad e^{j2\pi m/32}\,]^T$ When r=2, a candidate codebook Option b, as shown in Table 5-b, is a second codebook corresponding to LTE-A Rel12 rank2.

TABLE 5-b

| $i_1$ | $i_2$ | | | |
|---|---|---|---|---|
| | 0 | 1 | 2 | 3 |
| 0-15 | $W_{i_1+8,i_1+8,i+24,i+24,0,0}^{(2)}$ | $W_{i_1+8,i_1+8,i+24,i+24,0,2}^{(2)}$ | $W_{i_1+8,i_1+8,i+24,i+24,2,0}^{(2)}$ | $W_{i_1+8,i_1+8,i+24,i+24,2,2}^{(2)}$ |

| $i_1$ | $i_2$ | | | |
|---|---|---|---|---|
| | 4 | 5 | 6 | 7 |
| 0-15 | $W_{i_1,i_1,i_1,i_1,0,2}^{(2)}$ | $W_{i_1,i_1,i_1,i_1,1,3}^{(2)}$ | $W_{i_1+8,i_1+8,i_1+8,i_1+8,0,2}^{(2)}$ | $W_{i_1+8,i_1+8,i_1+8,i_1+8,1,3}^{(2)}$ |

| $i_1$ | $i_2$ | | | |
|---|---|---|---|---|
| | 8 | 9 | 10 | 11 |
| 0-15 | $W_{i_1+16,i_1+16,i_1+16,i_1+16,0,2}^{(2)}$ | $W_{i_1+16,i_1+16,i_1+16,i_1+16,1,3}^{(2)}$ | $W_{i_1+24,i_1+24,i_1+24,i_1+24,0,2}^{(2)}$ | $W_{i_1+24,i_1+24,i_1+24,i_1+24,1,3}^{(2)}$ |

| $i_1$ | $i_2$ | | | |
|---|---|---|---|---|
| | 12 | 13 | 14 | 15 |
| 0-15 | $W_{i_1,i_1+16,i_1+16,i_1,0,2}^{(2)}$ | $W_{i_1,i_1+8,i_1+24,i_1+24,i1+8,0,2}^{(2)}$ | $W_{i_1+16,i_1,i_1,i_1+16,0,2}^{(2)}$ | $W_{i_1+24,i_1+8,i_1+8,i_1+24,0,2}^{(2)}$ |

Wherein, $W_{m,m',m'',m''',n,n'}^{(2)} = \frac{1}{2} \begin{bmatrix} v_m & v_{m''} \\ \varphi_n v_{m'} & \varphi_{n'} v_{m'''} \end{bmatrix}$, $\phi_n = e^{j\pi n/2}$, $\phi_{n'} = e^{j\pi n'/2}$, $v_m = [\, 1 \quad e^{j2\pi m/32}\,]^T$ When r=3,4, a single codebook feedback technology is used, which uses codebooks of Ranks 3 and 4 in the Rel-8 4Tx. The use of the single codebook of Ranks 3 and 4 may be equivalent to considering that $i_1$=0-15 and $i_2$=0 or $i_2$=0-15 and $i_1$=0.

As in the LTE-A, the enhancement of the feedback accuracy makes the sum of overheads required for the feedback of the PMI1 and PMI2 information (which may also be construed as a total feedback overhead corresponding to W) increase relative to the overhead of the single codebook in the LTE, and when the codebook is applied to the feedback of channel information in the PUCCH and the PMI1 and PMI2 are transmitted in one subframe at the same time, the overhead of the CSI feedback of the PUCCH will exceed the overhead limit of 11 bits, which makes the transmission performance of the PUCCH degrade seriously, and seriously influences the system. In addition, even if the PMI1 and the PMI2 are transmitted separately, for example, the PMI1 and the RI are transmitted at the same time, although the feedback of the PMI+RI does not exceed the overhead limit of 11 bits, as the increase in overhead will cause an increase in the bit error rate in a case that the transmission resources are fixed, the bit error rate of the RI cannot be well ensured, and there is thus a problem that the bit error rate of the RI cannot meet requirements. When the wideband PMI2 and the wideband CQI are transmitted together, an excessive overhead will results in an increase in the bit error rate, which influences the performance of the system. Finally, when the subband PMI and the subband index as well as the subband CQI are transmitted together, the overhead limit of 11 bits will also be exceeded, which seriously reduces the performance. The above problem is an important technical problem to be solved in the related art.

SUMMARY OF THE INVENTION

The embodiments of the present invention provide a method and terminal for feeding back channel state information, to solve the problem in the related art that when the channel state information is fed back periodically, the transmission performance of the system is poor due to a large overhead of the channel state information, and at the same time, to ensure the accuracy of PMI feedback with a limited overhead and obtain better precoding performance.

The embodiments of the present invention provide a method for feeding back channel state information, applied to a 4-antenna system, comprising:

a terminal acquiring channel state information, the channel state information comprising a first class of Precoding Matrix Indicator (PMI1) information and Rank Indicator (RI) information;

the terminal performing joint encoding on the PMI1 information and the RI information into a 4-bit or 5-bit feedback report, wherein the feedback report is used for indicating one of a set of combination information formed by the RI information and the PMI1 information, and the set of combination information at least comprises one of:

combination information of RI=1 with M1 PMI1 respectively;

combination information of RI=2 with M2 PMI1 respectively;

combination information of RI=3 with one PMI1;

combination information of RI=4 with one PMI1;

wherein, M1=M2=8, or M1=M2=4, or M1=16 and M2=8, or M1=8 and M2=16, or M1=16 and M2=4, or M1=4 and M2=16, or M1=8 and M2=4, or M1=4 and M2=8; and the terminal feeding back the feedback report in a physical uplink control channel.

The above method may further comprise the following features: when M1=8 or M2=8, the 8 PMI1 indicate $0^{th}$, $2^{nd}$, $4^{th}$, $6^{th}$, $8^{th}$, $10^{th}$, $12^{th}$ and $14^{th}$ codewords in the Rel-8 codebook respectively; wherein the Rel-8 codebook in the present disclosure refers to the codebook defined in 3GPP TS 36.211 V8.9.0.

The above method may further comprise the following features: when M1=4 or M2=4, the 4 PMI1 indicate $0^{th}$, $4^{th}$, $8^{th}$ and $12^{th}$ codewords in the Rel-8 codebook respectively.

The above method may further comprise the following features: when M1=4 or M2=4, the 4 PMI1 indicate $0^{th}$, $2^{nd}$, $4^{th}$ and $6^{th}$ codewords in the Rel-8 codebook respectively.

The above method may further comprise the following features: when M1=M2, the M1 PMI1 are the same as the M2 PM2.

The above method may further comprise the following features: when M1=M2, the M1 PMI1 are different from the M2 PM2.

The embodiments of the present invention further provide a method for feeding back channel state information, applied to a 4-antenna system, comprising:

a terminal acquiring channel state information, the channel state information comprising Rank Indicator (RI) information, a second class of Precoding Matrix Indicator (PMI2) information, subband indication information, and channel quality information; and the terminal feeding back the channel state information in a physical uplink control channel, wherein, when RI=3 or 4, the PMI2 information comprises 2 bits, and the PMI2 indicates one codeword in a first set of codewords, and the first set of codewords comprises 4 codewords selected from a codebook corresponding to Ranks 3 and 4 in the Rel-8 codebook.

The above method may further comprise the following features: the first set of codewords comprises:

using $0^{th}$, $1^{st}$, $2^{nd}$, and $3^{rd}$ codewords in the codebook corresponding to Ranks 3 and 4 in the Rel-8 codebook as a first group, using $8^{th}$, $9^{th}$, $10^{th}$, and $11^{th}$ codewords in the codebook corresponding to Ranks 3 and 4 in the Rel-8 codebook as a second group, selecting 2 codewords from the first group and putting the 2 codewords in the first set of codewords, and selecting 2 codewords from the second group and putting the 2 codewords in the first set of codewords.

The above method may further comprise the following features: the first set of codewords comprises:

using $0^{th}$, $2^{nd}$, $8^{th}$, and $10^{th}$ codewords in the codebook corresponding to Ranks 3 and 4 in the Rel-8 codebook as a third group, using $1^{st}$, $3^{rd}$, $9^{th}$, and $11^{th}$ codewords in the codebook corresponding to Ranks 3 and 4 in the Rel-8 codebook as a fourth group, selecting 2 codewords from the third group and putting the 2 codewords in the first set of codewords, and selecting 2 codewords from the fourth group and putting the 2 codewords in the first set of codewords.

The above method may further comprise the following features: the first set of codewords comprises:

using $0^{th}$, $2^{nd}$, $3^{rd}$, and $10^{th}$ codewords in the codebook corresponding to Ranks 3 and 4 in the Rel-8 codebook as a fifth group, using $2^{nd}$, $8^{th}$, $9^{th}$, and $11^{th}$ codewords in the codebook corresponding to Ranks 3 and 4 in the Rel-8 codebook as a sixth group, selecting 2 codewords from the fifth group and putting the 2 codewords in the first set of codewords, and selecting 2 codewords from the sixth group and putting the 2 codewords in the first set of codewords.

The above method may further comprise the following features: the first set of codewords comprises:

using $0^{th}$, $1^{st}$, $2^{nd}$, and $9^{th}$ codewords in the codebook corresponding to Ranks 3 and 4 in the Rel-8 codebook as a seventh group, using $3^{rd}$, $10^{th}$, $8^{th}$, and $11^{th}$ codewords in the codebook corresponding to Ranks 3 and 4 in the Rel-8 codebook as an eighth group, selecting 2 codewords from the seventh group and putting the 2 codewords in the first set of codewords, and selecting 2 codewords from the eighth group and putting the 2 codewords in the first set of codewords.

The above method may further comprise the following features: the first set of codewords comprises:

$8^{th}$, $9^{th}$, $10^{th}$, and $11^{th}$ codewords in the codebook corresponding to Ranks 3 and 4 in the Rel-8 codebook.

The above method may further comprise the following features: the first set of codewords comprises:

$12^{th}$, $13^{th}$, $14^{th}$, and $15^{th}$ codewords in the codebook corresponding to Ranks 3 and 4 in the Rel-8 codebook.

The above method may further comprise the following features: the first set of codewords comprises:

$0^{th}$, $2^{nd}$, $12^{th}$, and $14^{th}$ codewords in the codebook corresponding to Ranks 3 and 4 in the Rel-8 codebook.

The above method may further comprise the following features: the first set of codewords comprises:

$4^{th}$, $5^{nd}$, $6^{th}$, and $7^{th}$ codewords in the codebook corresponding to Ranks 3 and 4 in the Rel-8 codebook.

The above method may further comprise the following features: the first set of codewords comprises:

$0^{th}$, $1^{st}$, $2^{nd}$, and $3^{rd}$ codewords in the codebook corresponding to Ranks 3 and 4 in the Rel-8 codebook.

The above method may further comprise the following features: the first set of codewords comprises:

$0^{th}$, $1^{st}$, $3^{rd}$ and $10^{th}$ codewords in the codebook corresponding to Ranks 3 and 4 in the Rel-8 codebook.

The above method may further comprise the following features: the first set of codewords comprises:

$0^{th}$, $1^{st}$, $8^{th}$, and $11^{th}$ codewords in the codebook corresponding to Ranks 3 and 4 in the Rel-8 codebook.

The above method may further comprise the following features: the first set of codewords comprises:

$0^{th}$, $1^{st}$, $2^{nd}$, and $9^{th}$ codewords in the codebook corresponding to Ranks 3 and 4 in the Rel-8 codebook.

The above method may further comprise the following features: the first set of codewords comprises:

$1^{st}$, $3^{rd}$, $9^{th}$ and $11^{th}$ codewords in the codebook corresponding to Ranks 3 and 4 in the Rel-8 codebook.

The above method may further comprise the following features: the first set of codewords comprises:

$0^{th}$, $2^{nd}$, $8^{th}$ and $10^{th}$ codewords in the codebook corresponding to Ranks 3 and 4 in the Rel-8 codebook.

The above method may further comprise the following features: the first set of codewords comprises:

$0^{th}$, $2^{nd}$, $3^{rd}$ and $10^{th}$ codewords in the codebook corresponding to Ranks 3 and 4 in the Rel-8 codebook.

The above method may further comprise the following features: the first set of codewords comprises:

$3^{rd}$, $8^{th}$, $10^{th}$ and $11^{th}$ codewords in the codebook corresponding to Ranks 3 and 4 in the Rel-8 codebook.

The above method may further comprise the following features: the first set of codewords comprises:

$2^{nd}$, $9^{th}$, $8^{th}$, and $11^{th}$ codewords in the codebook corresponding to Ranks 3 and 4 in the Rel-8 codebook.

The above method may further comprise the following features: the first set of codewords comprises:

$2^{nd}$, $3^{rd}$, $9^{th}$, and $10^{th}$ codewords in the codebook corresponding to Ranks 3 and 4 in the Rel-8 codebook.

The embodiments of the present invention further provide a method for feeding back channel state information, applied to a 4-antenna system, comprising:

a terminal acquiring channel state information, the channel state information comprising Rank Indicator (RI) information, a second class of Precoding Matrix Indicator (PMI2) information, subband indication information, and channel quality information; and the terminal feeding back the channel state information in a physical uplink control channel, wherein, when RI=1 or 2, the PMI2 information comprises 2 bits, and indicates one codeword in a second set of codewords, and the second set of codewords comprises:

$0^{th}$, $1^{st}$, $2^{nd}$, and $3^{rd}$ codewords in a codebook corresponding to rank 1 in the Long Term Evolution-Advanced (LTE-A) Rel12 version or a first or second codebook corresponding to rank 2 in the LTE-A Rel12 version; wherein the LTE-A Rel12 version in the present disclosure refers to 3GPP TS 36.213 V12.0.0; or $0^{th}$, $1^{st}$, $8^{th}$, and $9^{th}$ codewords in a codebook corresponding to rank 1 in the LTE-A Rel12 version or a first or second codebook corresponding to rank 2 in the LTE-A Rel12 version; or $0^{th}$, $4^{th}$, $8^{th}$, and $12^{th}$ codewords in a codebook corresponding to rank 1 in the LTE-A Rel12 version or a first or second codebook corresponding to rank 2 in the LTE-A Rel12 version; or $0^{th}$, $4^{th}$, $5^{th}$, and $12^{th}$ codewords in a codebook corresponding to rank 1 in the LTE-A Rel12 version or a first or second codebook corresponding to rank 2 in the LTE-A Rel12 version; or $0^{th}$, $1^{st}$, $4^{th}$, and $5^{th}$ codewords in a codebook corresponding to rank 1 in the LTE-A Rel12 version or a first or second codebook corresponding to rank 2 in the LTE-A Rel12 version; or $12^{th}$, $13^{th}$, $14^{th}$, and $15^{th}$ codewords in a codebook corresponding to rank 1 in the LTE-A Rel12 version or a first or second codebook corresponding to rank 2 in the LTE-A Rel12 version.

The embodiments of the present invention further provide a method for feeding back channel state information, applied to a 4-antenna system, comprising:

a terminal acquiring channel state information, the channel state information comprising Rank Indicator (RI) information, a first class of Precoding Matrix Indicator (PMI1) information, and a second class of Precoding Matrix Indicator (PMI2) information; and the terminal performing joint encoding on the PMI1 information and the PMI2 information into a 4-bit feedback report, and the terminal feeding back the feedback report in a physical uplink control channel; wherein, the feedback report is used for indicating one of a set of combination information formed by the PMI1 and the PMI2, and codewords indicated by the set of combination information comprise codewords in a codebook corresponding to Rank 1 or a first or second codebook corresponding to Rank 2 in the Long Term Evolution-Advanced (LTE-A) Rel12 version.

The above method may further comprise the following features: when RI=1, the codewords indicated by the set of combination information comprise codewords in the codebook corresponding to Rank 1 in the LTE-A Rel12 version, and the codewords indicated by the set of combination information meet:

conforming to a model $$\begin{bmatrix} u \\ e^{j\frac{m\pi}{4}} \cdot e^{j\frac{n\pi}{2}} \cdot u \end{bmatrix} m = 0, 1 \ n = 0, 1, 2, 3,$$

wherein u is a 2-dimensional column vector.

The above method may further comprise the following features: the codewords indicated by the set of combination information meet m=0; or one half of the codewords indicated by the set of combination information meet the model when m=0, and the other half of the codewords indicated by the set of combination information meet the model when m=1; or the codewords indicated by the set of combination information meet m=1.

The above method may further comprise the following features: a set of codewords indicated by the set of combination information is:

$$\begin{bmatrix} u_i \\ e^{j\theta_i} u_i \end{bmatrix} i = 0 \sim 15,$$

wherein $\theta_i$ is any real number, and $u_i$ is a 2-dimensional column vector.

The above method may further comprise the following features:

$$u_i \in \left\{ \begin{bmatrix} 1 \\ 1 \end{bmatrix} \begin{bmatrix} 1 \\ -1 \end{bmatrix} \right\},$$

wherein,
in $\{u_i, i=0\sim15\}$, 8 values are $$\begin{bmatrix} 1 \\ 1 \end{bmatrix},$$

and 8 values are $$\begin{bmatrix} 1 \\ -1 \end{bmatrix}.$$

The above method may further comprise the following features:

$$u_i \in \left\{ \begin{bmatrix} 1 \\ j \end{bmatrix} \begin{bmatrix} 1 \\ -j \end{bmatrix} \right\},$$

wherein, in $\{u_i, i=0\sim15\}$, 8 values are $$\begin{bmatrix} 1 \\ j \end{bmatrix},$$

and 8 values are $$\begin{bmatrix} 1 \\ -j \end{bmatrix}.$$

The above method may further comprise the following features:

$$u_i \in \left\{ \begin{bmatrix} 1 \\ 1 \end{bmatrix} \begin{bmatrix} 1 \\ j \end{bmatrix} \right\},$$

wherein, in $\{u_i, i=0\sim15\}$, 8 values are $$\begin{bmatrix} 1 \\ 1 \end{bmatrix},$$

and 8 values are $$\begin{bmatrix} 1 \\ j \end{bmatrix}.$$

The above method may further comprise the following features:

$$u_i \in \left\{ \begin{bmatrix} 1 \\ 1 \end{bmatrix} \begin{bmatrix} 1 \\ -1 \end{bmatrix} \begin{bmatrix} 1 \\ j \end{bmatrix} \begin{bmatrix} 1 \\ -j \end{bmatrix} \right\},$$

wherein, in $\{u_i, i=0\sim15\}$, 4 values are $$\begin{bmatrix} 1 \\ 1 \end{bmatrix},$$

4 values are $$\begin{bmatrix} 1 \\ -1 \end{bmatrix},$$

4 values are $$\begin{bmatrix} 1 \\ j \end{bmatrix},$$

and 4 values are $$\begin{bmatrix} 1 \\ -j \end{bmatrix}.$$

The above method may further comprise the following features:

$$u_i \in \left\{ \begin{bmatrix} 1 \\ 1 \end{bmatrix} \begin{bmatrix} 1 \\ e^{j\frac{\pi}{4}} \end{bmatrix} \begin{bmatrix} 1 \\ j \end{bmatrix} \begin{bmatrix} 1 \\ e^{j\frac{3\pi}{4}} \end{bmatrix} \begin{bmatrix} 1 \\ -1 \end{bmatrix} \begin{bmatrix} 1 \\ e^{j\frac{5\pi}{4}} \end{bmatrix} \begin{bmatrix} 1 \\ -j \end{bmatrix} \begin{bmatrix} 1 \\ e^{j\frac{7\pi}{4}} \end{bmatrix} \right\},$$

wherein in $\{u_i, i=0\sim15\}$, 2 values are $$\begin{bmatrix} 1 \\ 1 \end{bmatrix},$$

2 values are $$\begin{bmatrix} 1 \\ e^{j\frac{\pi}{4}} \end{bmatrix},$$

2 values are $$\begin{bmatrix} 1 \\ j \end{bmatrix},$$

2 values are $$\begin{bmatrix} 1 \\ e^{j\frac{3\pi}{4}} \end{bmatrix},$$

2 values are $$\begin{bmatrix} 1 \\ -1 \end{bmatrix},$$

2 values are $$\begin{bmatrix} 1 \\ e^{j\frac{5\pi}{4}} \end{bmatrix},$$

2 values are $$\begin{bmatrix} 1 \\ -j \end{bmatrix},$$

and 2 values are $$\begin{bmatrix} 1 \\ e^{j\frac{7\pi}{4}} \end{bmatrix}.$$

The above method may further comprise the following features:

$$u_i \in \left\{ \begin{bmatrix} 1 \\ 1 \end{bmatrix} \begin{bmatrix} 1 \\ -1 \end{bmatrix} \begin{bmatrix} 1 \\ j \end{bmatrix} \begin{bmatrix} 1 \\ -j \end{bmatrix} \right\},$$

wherein, in $\{u_i, i=0\sim15\}$, when 4 values of $u_i$ are $$\begin{bmatrix} 1 \\ 1 \end{bmatrix},$$

m=0, when 4 values of $u_i$ are $$\begin{bmatrix} 1 \\ -1 \end{bmatrix},$$

m=1, when 4 values are $$\begin{bmatrix} 1 \\ j \end{bmatrix},$$

m=0, and when 4 values are $$\begin{bmatrix} 1 \\ -j \end{bmatrix},$$

m=1.

The above method may further comprise the following features:

$$u_i \in \left\{ \begin{bmatrix} 1 \\ 1 \end{bmatrix} \begin{bmatrix} 1 \\ e^{j\frac{\pi}{4}} \end{bmatrix} \begin{bmatrix} 1 \\ j \end{bmatrix} \begin{bmatrix} 1 \\ e^{j\frac{3\pi}{4}} \end{bmatrix} \begin{bmatrix} 1 \\ -1 \end{bmatrix} \begin{bmatrix} 1 \\ e^{j\frac{5\pi}{4}} \end{bmatrix} \begin{bmatrix} 1 \\ -j \end{bmatrix} \begin{bmatrix} 1 \\ e^{j\frac{7\pi}{4}} \end{bmatrix} \right\},$$

wherein, in $\{u_i, i=0\sim15\}$, when 2 values of $u_i$ are $$\begin{bmatrix} 1 \\ 1 \end{bmatrix},$$

m=0, when 2 values of $u_i$ are $$\begin{bmatrix} 1 \\ e^{j\frac{\pi}{4}} \end{bmatrix},$$

m=0 when 2 values of $u_i$ are $$\begin{bmatrix} 1 \\ j \end{bmatrix},$$

m=0, when 2 values of $u_i$ are $$\begin{bmatrix} 1 \\ e^{j\frac{3\pi}{4}} \end{bmatrix},$$

m=0, when 2 values of $u_i$ are $$\begin{bmatrix} 1 \\ -1 \end{bmatrix},$$

m=1, when 2 values of $u_i$ are $$\begin{bmatrix} 1 \\ e^{j\frac{5\pi}{4}} \end{bmatrix},$$

m=1, when 2 values of $u_i$ are $$\begin{bmatrix} 1 \\ -j \end{bmatrix},$$

m=1, and when 2 values of $u_i$ are $$\begin{bmatrix} 1 \\ e^{j\frac{7\pi}{4}} \end{bmatrix},$$

m=1

The above method may further comprise the following features: when RI=2, codewords indicated by the set of combination information comprise codewords of a first codebook corresponding to Rank2 in the LTE-A Rel12 version, and the codewords indicated by the set of combination information comply with a model $$\begin{bmatrix} u_{i_1} & u_{i_2} \\ e^{j\theta_m} u_{i_1} & -e^{j\theta_m} u_{i_2} \end{bmatrix} i_1, i_2, m = 0 \sim 15,$$

wherein $\theta_m$ is any real number, and $u_i$ is a 2-dimensional column vector.

The above method may further comprise the following features: for all $i_1$ and $i_2$, $i_1=i_2$; or in the codewords, one half of the codewords meet $i_2=i_1$, and the other half of the codewords meet $i_2 \neq i_1$.

The above method may further comprise the following features:

$$u_{i_1}, u_{i_2} \in \left\{ \begin{bmatrix} 1 \\ 1 \end{bmatrix} \begin{bmatrix} 1 \\ -1 \end{bmatrix} \right\},$$

wherein, in $\{u_{i_1}, u_{i_2}, i=0\sim15\}$, 8 values of $u_{i_1}, u_{i_2}$ are $$\begin{bmatrix} 1 \\ 1 \end{bmatrix},$$

and 8 values of $u_{i_1}, u_{i_2}$ are $$\begin{bmatrix} 1 \\ -1 \end{bmatrix}$$

respectively.

The above method may further comprise the following features:

$$u_{i_1}, u_{i_2} \in \left\{ \begin{bmatrix} 1 \\ j \end{bmatrix} \begin{bmatrix} 1 \\ -j \end{bmatrix} \right\},$$

wherein, in $\{u_{i_1}, u_{i_2}, i=0\sim15\}$, 8 values of $u_{i_1}, u_{i_2}$ are $$\begin{bmatrix} 1 \\ j \end{bmatrix},$$

and 8 values of $u_{i_1}, u_{i_2}$ are $$\begin{bmatrix} 1 \\ -j \end{bmatrix}$$

respectively.

The above method may further comprise the following features:

$$u_{i_1}, u_{i_2} \in \left\{ \begin{bmatrix} 1 \\ j \end{bmatrix} \begin{bmatrix} 1 \\ 1 \end{bmatrix} \right\},$$

wherein, in $\{u_{i_1}, u_{i_2}, i=0\sim15\}$, 8 values of $u_{i_1}, u_{i_2}$ are $$\begin{bmatrix} 1 \\ 1 \end{bmatrix},$$

and 8 values of $u_{i_1}, u_{i_2}$ are $$\begin{bmatrix} 1 \\ j \end{bmatrix}$$

respectively.

The above method may further comprise the following features:

$$u_{i_1}, u_{i_2} \in \left\{ \begin{bmatrix} 1 \\ 1 \end{bmatrix} \begin{bmatrix} 1 \\ -1 \end{bmatrix} \begin{bmatrix} 1 \\ j \end{bmatrix} \begin{bmatrix} 1 \\ -j \end{bmatrix} \right\},$$

wherein, in $\{u_{i_1}, u_{i_2}, i=0\sim15\}$, 6 values of $u_{i_1}$ are $$\begin{bmatrix} 1 \\ 1 \end{bmatrix},$$

2 values of $u_{i_1}$ are $$\begin{bmatrix} 1 \\ -1 \end{bmatrix},$$

6 values of $u_{i_1}$ are $$\begin{bmatrix} 1 \\ j \end{bmatrix},$$

and 2 values of $u_{i_1}$ are $$\begin{bmatrix} 1 \\ -j \end{bmatrix};$$

and 2 values of $u_{i_2}$ are $$\begin{bmatrix} 1 \\ 1 \end{bmatrix},$$

4 values of $u_{i_2}$ are $$\begin{bmatrix} 1 \\ -1 \end{bmatrix},$$

4 values of $u_{i_2}$ are $$\begin{bmatrix} 1 \\ j \end{bmatrix},$$

and 6 values of $u_{i_2}$ are $$\begin{bmatrix} 1 \\ -j \end{bmatrix}.$$

The above method may further comprise the following features:

$$u_{i_1}, u_{i_2} \in \left\{ \begin{bmatrix} 1 \\ 1 \end{bmatrix} \begin{bmatrix} 1 \\ e^{j\frac{\pi}{4}} \end{bmatrix} \begin{bmatrix} 1 \\ j \end{bmatrix} \begin{bmatrix} 1 \\ e^{j\frac{3\pi}{4}} \end{bmatrix} \begin{bmatrix} 1 \\ -1 \end{bmatrix} \begin{bmatrix} 1 \\ e^{j\frac{5\pi}{4}} \end{bmatrix} \begin{bmatrix} 1 \\ -j \end{bmatrix} \begin{bmatrix} 1 \\ e^{j\frac{7\pi}{4}} \end{bmatrix} \right\},$$

wherein, in $\{u_{i_1}, u_{i_2}, i=0\sim15\}$, 2 values of $u_{i_1}, u_{i_2}$ are $$\begin{bmatrix} 1 \\ 1 \end{bmatrix},$$

2 values of $u_{i_1}, u_{i_2}$ are $$\begin{bmatrix} 1 \\ e^{j\frac{\pi}{4}} \end{bmatrix},$$

2 values of $u_{i_1}, u_{i_2}$ are $$\begin{bmatrix} 1 \\ j \end{bmatrix},$$

2 values of $u_{i_1}, u_{i_2}$ are $$\begin{bmatrix} 1 \\ e^{j\frac{3\pi}{4}} \end{bmatrix},$$

2 values of $u_{i_1}, u_{i_2}$ are $$\begin{bmatrix} 1 \\ -1 \end{bmatrix},$$

2 values $u_{i_1}, u_{i_2}$ are $$\begin{bmatrix} 1 \\ e^{j\frac{5\pi}{4}} \end{bmatrix},$$

2 values of $u_{i_1}, u_{i_2}$ are $$\begin{bmatrix} 1 \\ -j \end{bmatrix},$$

and 2 values of $u_{i_1}, u_{i_2}$ are $$\begin{bmatrix} 1 \\ e^{j\frac{7\pi}{4}} \end{bmatrix}$$

respectively.

The above method may further comprise the following features: when RI=2, codewords indicated by the set of combination information comprise codewords of a second codebook corresponding to Rank2 in the LTE-A Rel12 version, and the codewords indicated by the set of combination information comply with a model $$\begin{bmatrix} u_{i_1} & u_{i_3} \\ e^{j\theta_m} u_{i_2} & e^{j\theta_n} u_{i_4} \end{bmatrix} i_1, i_2, i_3, i_4, m, n = 0 \sim 15,$$

wherein $\theta_m, \theta_n$ are any real numbers, and $u_i$ is a 2-dimensional column vector.

The above method may further comprise the following features: the $u_{i_1}, u_{i_2}, u_{i_3}, u_{i_4}$ meet $i_2=i_1=i_4=i_3$; or
$i_2=i_1$ and $i_4=i_3$, and one half of the codewords indicated by the set of combination information meet $i_2=i_1=i_4=i_3$, and the other half of the codewords meet $i_1 \neq i_3$; or all codewords indicated by the set of combination information meet $i_2=i_1$ and $i_4=i_3$, and the number of codewords which meet $i_2=i_1,i_4=i_3$ is more than the number of codewords which meet $i_1 \neq i_3$; or one half of codewords indicated by the set of combination information meet $i_2=i_1=i_4=i_3$, a quarter of the codewords meet $i_2=i_1$, $i_4=i_3$ and $i_1 \neq i_3$, and a quarter of the codewords meet $i_1=i_4$, $i_2=i_3$, and $i_1 \neq i_2$.

The embodiments of the present invention further provide a terminal, comprising:

a channel state information acquisition unit, configured to acquire channel state information, the channel state information comprising a first class of Precoding Matrix Indicator (PMI1) information and Rank Indicator (RI) information;

an encoding unit, configured to perform joint encoding on the PMI1 information and the RI information into a 4-bit or 5-bit feedback report, wherein the feedback report is used for indicating one of a set of combination information formed by the RI information and the PMI1 information, and the set of combination information at least comprises one of:

combination information of RI=1 with M1 PMI1 respectively;

combination information of RI=2 with M2 PMI1 respectively;

combination information of RI=3 with one PMI1;

combination information of RI=4 with one PMI1;

wherein, M1=M2=8, or M1=M2=4, or M1=16 and M2=8, or M1=8 and M2=16, or M1=16 and M2=4, or M1=4 and M2=16, or M1=8 and M2=4, or M1=4 and M2=8; and a feedback unit, configured to feed back the feedback report in a physical uplink control channel.

The above terminal may further comprise the following features: when M1=8 or M2=8, the 8 PMI1 indicate $0^{th}$, $2^{nd}$, $4^{th}$, $6^{th}$, $8^{th}$, $10^{th}$, $12^{th}$ and $14^{th}$ codewords in the Rel-8 codebook respectively.

The above terminal may further comprise the following features: when M1=4 or M2=4, the 4 PMI1 indicate $0^{th}$, $4^{th}$, $8^{th}$ and $12^{th}$ codewords in the Rel-8 codebook respectively.

The above terminal may further comprise the following features: when M1=4 or M2=4, the 4 PMI1 indicate $0^{th}$, $2^{nd}$, $4^{th}$ and $6^{th}$ codewords in the Rel-8 codebook respectively.

The above terminal may further comprise the following features: when M1=M2, the M1 PMI1 are the same as the M2 PMI2.

The above terminal may further comprise the following features: when M1=M2, the M1 PMI1 are different from the M2 PMI2.

The embodiments of the present invention further provide a terminal, comprising:

a channel state information acquisition unit, configured to acquire channel state information, the channel state information comprising Rank Indicator (RI) information, a second class of Precoding Matrix Indicator (PMI2) information, subband indication information, and channel quality information; and a feedback unit, configured to feed back the channel state information in a physical uplink control channel, wherein, when RI=3 or 4, the PMI2 information comprises 2 bits, and the PMI2 indicates one codeword in a first set of codewords, and the first set of codewords comprises 4 codewords selected from a codebook corresponding to Ranks 3 and 4 in the Rel-8 codebook.

The above terminal may further comprise the following features: the first set of codewords comprise:

using $0^{th}$, $1^{st}$, $2^{nd}$, and $3^{rd}$ codewords of the codebook corresponding to Ranks 3 and 4 in the Rel-8 codebook as a first group, using $8^{th}$, $9^{th}$, $10^{th}$, and $11^{th}$ codewords of the codebook corresponding to Ranks 3 and 4 in the Rel-8 codebook as a second group, selecting 2 codewords from the first group and putting the 2 codewords in the first set of codewords, and selecting 2 codewords from the second group and putting the 2 codewords in the first set of codewords.

The above terminal may further comprise the following features: the first set of codewords comprises:

using $0^{th}$, $2^{nd}$, $8^{th}$, and $10^{th}$ codewords of the codebook corresponding to Ranks 3 and 4 in the Rel-8 codebook as a third group, using $1^{st}$, $3^{rd}$, $9^{th}$, and $11^{th}$ codewords of the codebook corresponding to Ranks 3 and 4 in the Rel-8 codebook as a fourth group, selecting 2 codewords from the third group and putting the 2 codewords in the first set of codewords, and selecting 2 codewords from the fourth group and putting the 2 codewords in the first set of codewords.

The above terminal may further comprise the following features: the first set of codewords comprises:

using $0^{th}$, $2^{nd}$, $3^{rd}$, and $10^{th}$ codewords of the codebook corresponding to Ranks 3 and 4 in the Rel-8 codebook as a fifth group, using $2^{nd}$, $8^{th}$, $9^{th}$, and $11^{th}$ codewords of the codebook corresponding to Ranks 3 and 4 in the Rel-8 codebook as a sixth group, selecting 2 codewords from the fifth group and putting the 2 codewords in the first set of codewords, and selecting 2 codewords from the sixth group and putting the 2 codewords in the first set of codewords.

The above terminal may further comprise the following features: the first set of codewords comprises:

using $0^{th}$, $1^{st}$, $2^{nd}$, and $9^{th}$ codewords of the codebook corresponding to Ranks 3 and 4 in the Rel-8 codebook as a seventh group, using $3^{rd}$, $10^{th}$, $8^{th}$, and $11^{th}$ codewords of the codebook corresponding to Ranks 3 and 4 in the Rel-8 codebook as an eighth group, selecting 2 codewords from the seventh group and putting the 2 codewords in the first set of codewords, and selecting 2 codewords from the eighth group and putting the 2 codewords in the first set of codewords.

The above terminal may further comprise the following features: the first set of codewords comprises:

$8^{th}$, $9^{th}$, $10^{th}$, and $11^{th}$ codewords of the codebook corresponding to Ranks 3 and 4 in the Rel-8 codebook.

The above terminal may further comprise the following features: the first set of codewords comprises:

$12^{th}$, $13^{th}$, $14^{th}$, and $15^{th}$ codewords of the codebook corresponding to Ranks 3 and 4 in the Rel-8 codebook.

The above terminal may further comprise the following features: the first set of codewords comprises:

$0^{th}$, $2^{nd}$, $12^{th}$, and $14^{th}$ codewords of the codebook corresponding to Ranks 3 and 4 in the Rel-8 codebook.

The above terminal may further comprise the following features: the first set of codewords comprises:

$4^{th}$, $5^{nd}$, $6^{th}$, and $7^{th}$ codewords of the codebook corresponding to Ranks 3 and 4 in the Rel-8 codebook.

The above terminal may further comprise the following features: the first set of codewords comprises:

$0^{th}$, $1^{st}$, $2^{nd}$, and 3rd codewords of the codebook corresponding to Ranks 3 and 4 in the Rel-8 codebook.

The above terminal may further comprise the following features: the first set of codewords comprises:

$0^{th}$, $1^{st}$, 3rd, and $10^{th}$ codewords of the codebook corresponding to Ranks 3 and 4 in the Rel-8 codebook.

The above terminal may further comprise the following features: the first set of codewords comprises:

$0^{th}$, $1^{st}$, $8^{th}$, and $11^{th}$ codewords of the codebook corresponding to Ranks 3 and 4 in the Rel-8 codebook.

The above terminal may further comprise the following features: the first set of codewords comprises:

$0^{th}$, $1^{st}$, $2^{nd}$, and $9^{th}$ codewords of the codebook corresponding to Ranks 3 and 4 in the Rel-8 codebook.

The above terminal may further comprise the following features: the first set of codewords comprises:

$1^{st}$, 3rd, $9^{th}$ and $11^{th}$ codewords of the codebook corresponding to Ranks 3 and 4 in the Rel-8 codebook.

The above terminal may further comprise the following features: the first set of codewords comprises:

$0^{th}$, $2^{nd}$, $8^{th}$ and $10^{th}$ codewords of the codebook corresponding to Ranks 3 and 4 in the Rel-8 codebook.

The above terminal may further comprise the following features: the first set of codewords comprises:

$0^{th}$, $2^{nd}$, 3rd and $10^{th}$ codewords of the codebook corresponding to Ranks 3 and 4 in the Rel-8 codebook.

The above terminal may further comprise the following features: the first set of codewords comprises:

3rd, $8^{th}$, $10^{th}$ and $11^{th}$ codewords of the codebook corresponding to Ranks 3 and 4 in the Rel-8 codebook.

The above terminal may further comprise the following features: the first set of codewords comprises:

$2^{nd}$, $9^{th}$, $8^{th}$, and $11^{th}$ codewords of the codebook corresponding to Ranks 3 and 4 in the Rel-8 codebook.

The above terminal may further comprise the following features: the first set of codewords comprises:

$2^{nd}$, $3^{rd}$, $9^{th}$, and $10^{th}$ codewords of the codebook corresponding to Ranks 3 and 4 in the Rel-8 codebook.

The embodiments of the present invention further provide a terminal, comprising:

a channel state information acquisition unit, configured to acquire channel state information, the channel state information comprising Rank Indicator (RI) information, a second class of Precoding Matrix Indicator (PMI2) information, subband indication information, and channel quality information; and a feedback unit, configured to feed back the channel state information in a physical uplink control channel, wherein, when RI=1 or 2, the PMI2 information comprises 2 bits, and indicates one codeword in a second set of codewords, and the second set of codewords comprises:

$0^{th}$, $1^{st}$, $2^{nd}$, and 3rd codewords in a codebook corresponding to rank 1 in the Long Term Evolution-Advanced (LTE-A) Rel12 version or a first or second codebook corresponding to rank 2 in the LTE-A Rel12 version; or $0^{th}$, $1^{st}$, $8^{th}$, and $9^{th}$ codewords in a codebook corresponding to rank 1 in the LTE-A Rel12 version or a first or second codebook corresponding to rank 2 in the LTE-A Rel12 version; or $0^{th}$, $4^{th}$, $8^{th}$, and $12^{th}$ codewords in a codebook corresponding to rank 1 in the LTE-A Rel12 version or a first or second codebook corresponding to rank 2 in the LTE-A Rel12 version; or $0^{th}$, $4^{th}$, $5^{th}$, and $12^{th}$ codewords in a codebook corresponding to rank 1 in the LTE-A Rel12 version or a first or second codebook corresponding to rank 2 in the LTE-A Rel12 version; or $0^{th}$, $1^{st}$, $4^{th}$, and $5^{th}$ codewords in a codebook corresponding to rank 1 in the LTE-A Rel12 version or a first or second codebook corresponding to rank 2 in the LTE-A Rel12 version; or $12^{th}$, $13^{th}$, $14^{th}$, and $15^{th}$ codewords in a codebook corresponding to rank 1 in the LTE-A Rel12 version or a first or second codebook corresponding to rank 2 in the LTE-A Rel12 version.

The embodiments of the present invention further provide a terminal, comprising:

a channel state information acquisition unit, configured to acquire channel state information, the channel state information comprising Rank Indicator (RI) information, a first class of Precoding Matrix Indicator (PMI1) information, and a second class of Precoding Matrix Indicator (PMI2) information; and an encoding unit, configured to perform joint encoding on the PMI1 information and the PMI2 information into a 4-bit feedback report, wherein, the feedback report is used for indicating one of a set of combination information formed by the PMI1 and the PMI2, and codewords indicated by the set of combination information comprise codewords in a codebook corresponding to Rank 1 or a first or second codebook corresponding to Rank 2 in the Long Term Evolution-Advanced (LTE-A) Rel12 version; and a feedback unit, configured to feed back the feedback report in a physical uplink control channel.

The above terminal may further comprise the following features: when RI=1, the codewords indicated by the set of combination information comprise codewords in the codebook corresponding to Rank 1 in the LTE-A Rel12 version, and the codewords indicated by the set of combination information meet:

complying with a model $$\begin{bmatrix} u \\ e^{j\frac{m\pi}{4}} \cdot e^{j\frac{n\pi}{2}} \cdot u \end{bmatrix} m = 0, 1 \ \ n = 0, 1, 2, 3,$$

wherein u is a 2-dimensional column vector.

The above terminal may further comprise the following features: the codewords indicated by the set of combination information meet m=0; or one half of the codewords indicated by the set of combination information meet the model when m=0, and the other half of the codewords indicated by the set of combination information meet the model when m=1; or the codewords indicated by the set of combination information meet m=1.

The above terminal may further comprise the following features: a set of codewords indicated by the set of combination information is:

$$\begin{bmatrix} u_i \\ e^{j\theta_i} u_i \end{bmatrix} i = 0 \sim 15,$$

wherein $\theta_i$ is any real number, and $u_i$ is a 2-dimensional column vector.

The above terminal may further comprise the following features:

$$u_i \in \left\{ \begin{bmatrix} 1 \\ 1 \end{bmatrix} \begin{bmatrix} 1 \\ -1 \end{bmatrix} \right\},$$

wherein in $\{u_i, i=0\sim15\}$, 8 values are $$\begin{bmatrix} 1 \\ 1 \end{bmatrix},$$

and 8 values are $$\begin{bmatrix} 1 \\ -1 \end{bmatrix}.$$

The above terminal may further comprise the following features:

$$u_i \in \left\{ \begin{bmatrix} 1 \\ j \end{bmatrix} \begin{bmatrix} 1 \\ -j \end{bmatrix} \right\},$$

wherein, in $\{u_i, i=0\sim15\}$, 8 values are $$\begin{bmatrix} 1 \\ j \end{bmatrix},$$

and 8 values are $$\begin{bmatrix} 1 \\ -j \end{bmatrix}.$$

The above terminal may further comprise the following features:

$$u_i \in \left\{ \begin{bmatrix} 1 \\ 1 \end{bmatrix} \begin{bmatrix} 1 \\ j \end{bmatrix} \right\},$$

wherein, in $\{u_i, i=0\sim15\}$, 8 values are $$\begin{bmatrix} 1 \\ 1 \end{bmatrix},$$

and 8 values are.

$$\begin{bmatrix} 1 \\ j \end{bmatrix}.$$

The above terminal may further comprise the following features:

$$u_i \in \left\{ \begin{bmatrix} 1 \\ 1 \end{bmatrix} \begin{bmatrix} 1 \\ -1 \end{bmatrix} \begin{bmatrix} 1 \\ j \end{bmatrix} \begin{bmatrix} 1 \\ -j \end{bmatrix} \right\},$$

wherein, in $\{u_i, i=0\sim15\}$, 4 values are $$\begin{bmatrix} 1 \\ 1 \end{bmatrix},$$

4 values are $$\begin{bmatrix} 1 \\ -1 \end{bmatrix},$$

4 values are $$\begin{bmatrix} 1 \\ j \end{bmatrix},$$

and 4 values are $$\begin{bmatrix} 1 \\ -j \end{bmatrix}.$$

The above terminal may further comprise the following features:

$$u_i \in \left\{ \begin{bmatrix} 1 \\ 1 \end{bmatrix} \begin{bmatrix} 1 \\ e^{j\frac{\pi}{4}} \end{bmatrix} \begin{bmatrix} 1 \\ j \end{bmatrix} \begin{bmatrix} 1 \\ e^{j\frac{3\pi}{4}} \end{bmatrix} \begin{bmatrix} 1 \\ -1 \end{bmatrix} \begin{bmatrix} 1 \\ e^{j\frac{5\pi}{4}} \end{bmatrix} \begin{bmatrix} 1 \\ -j \end{bmatrix} \begin{bmatrix} 1 \\ e^{j\frac{7\pi}{4}} \end{bmatrix} \right\},$$

wherein, in $\{u_i, i=0\sim15\}$, 2 values are $$\begin{bmatrix} 1 \\ 1 \end{bmatrix},$$

2 values are $$\begin{bmatrix} 1 \\ e^{j\frac{\pi}{4}} \end{bmatrix},$$

2 values are $$\begin{bmatrix} 1 \\ j \end{bmatrix},$$

2 values are $$\begin{bmatrix} 1 \\ e^{j\frac{3\pi}{4}} \end{bmatrix},$$

2 values are $$\begin{bmatrix} 1 \\ -1 \end{bmatrix},$$

2 values are $$\begin{bmatrix} 1 \\ e^{j\frac{5\pi}{4}} \end{bmatrix},$$

2 values are $$\begin{bmatrix} 1 \\ -j \end{bmatrix},$$

and 2 values are $$\begin{bmatrix} 1 \\ e^{j\frac{7\pi}{4}} \end{bmatrix}.$$

The above terminal may further comprise the following features:

$$u_i \in \left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix} \right\},$$

wherein, in $\{u_i, i=0\sim15\}$, when 4 values of $u_i$ are $$\begin{bmatrix} 1 \\ 1 \end{bmatrix},$$

m=0, when 4 values of $u_i$ are $$\begin{bmatrix} 1 \\ -1 \end{bmatrix},$$

m=1, when 4 values of $u_i$ are $$\begin{bmatrix} 1 \\ j \end{bmatrix},$$

m=0, and when 4 values of $u_i$ are $$\begin{bmatrix} 1 \\ -j \end{bmatrix},$$

m=1.

The above terminal may further comprise the following features:

$$u_i \in \left\{ \begin{bmatrix} 1 \\ 1 \end{bmatrix}, \begin{bmatrix} 1 \\ e^{j\frac{\pi}{4}} \end{bmatrix}, \begin{bmatrix} 1 \\ j \end{bmatrix}, \begin{bmatrix} 1 \\ e^{j\frac{3\pi}{4}} \end{bmatrix}, \begin{bmatrix} 1 \\ -1 \end{bmatrix}, \begin{bmatrix} 1 \\ e^{j\frac{5\pi}{4}} \end{bmatrix}, \begin{bmatrix} 1 \\ -j \end{bmatrix}, \begin{bmatrix} 1 \\ e^{j\frac{7\pi}{4}} \end{bmatrix} \right\},$$

wherein, in $\{u_i, i=0\sim15\}$, when 2 values of $u_i$ are $$\begin{bmatrix} 1 \\ 1 \end{bmatrix},$$

m=0, when 2 values of $u_i$ are $$\begin{bmatrix} 1 \\ e^{j\frac{\pi}{4}} \end{bmatrix},$$

m=0, when 2 values of $u_i$ are $$\begin{bmatrix} 1 \\ j \end{bmatrix},$$

m=0, when 2 values of $u_i$ are $$\begin{bmatrix} 1 \\ e^{j\frac{3\pi}{4}} \end{bmatrix},$$

m=0, when 2 values of $u_i$ are $$\begin{bmatrix} 1 \\ -1 \end{bmatrix},$$

m=1, when 2 values of $u_i$ are $$\begin{bmatrix} 1 \\ e^{j\frac{5\pi}{4}} \end{bmatrix},$$

m=1, when 2 values of $u_i$ are $$\begin{bmatrix} 1 \\ -j \end{bmatrix},$$

m=1, and when 2 values of $u_i$ are $$\begin{bmatrix} 1 \\ e^{j\frac{7\pi}{4}} \end{bmatrix},$$

m=1.

The above terminal may further comprise the following features: when RI=2, codewords indicated by the set of combination information comprise codewords of a first codebook corresponding to Rank2 in the LT-A Rel12 version, and the codewords indicated by the set of combination information comply with a model $$\begin{bmatrix} u_{i_1} & u_{i_2} \\ e^{j\theta_m}u_{i_1} & -e^{j\theta_m}u_{i_2} \end{bmatrix} i_1, i_2, m = 0\sim15,$$

wherein $\theta_m$ is any real number, and $u_i$ is a 2-dimensional column vector.

The above terminal may further comprise the following features: for all $i_1$ and $i_2$, $i_1=i_2$; or in the codewords, one half of the codewords meet $i_2=i_1$, and the other half of the codewords meet $i_2 \ne i_1$.

The above terminal may further comprise the following features:

$$u_{i_1}, u_{i_2} \in \left\{ \begin{bmatrix} 1 \\ 1 \end{bmatrix} \begin{bmatrix} 1 \\ -1 \end{bmatrix} \right\},$$

wherein, in $\{u_{i_1}, u_{i_2}, i=0\sim 15\}$, 8 values of $u_{i_1}, u_{i_2}$ are $$\begin{bmatrix} 1 \\ 1 \end{bmatrix},$$

and 8 values of $u_{i_1}, u_{i_2}$ are $$\begin{bmatrix} 1 \\ -1 \end{bmatrix}$$

respectively.

The above terminal may further comprise the following features:

$$u_{i_1}, u_{i_2} \in \left\{ \begin{bmatrix} 1 \\ j \end{bmatrix} \begin{bmatrix} 1 \\ -j \end{bmatrix} \right\},$$

wherein, in $\{u_{i_1}, u_{i_2}, i=0\sim 15\}$, 8 values of $u_{i_1}, u_{i_2}$ are $$\begin{bmatrix} 1 \\ j \end{bmatrix},$$

and 8 values of $u_{i_1}, u_{i_2}$ are $$\begin{bmatrix} 1 \\ -j \end{bmatrix}$$

respectively.

The above terminal may further comprise the following features:

$$u_{i_1}, u_{i_2} \in \left\{ \begin{bmatrix} 1 \\ j \end{bmatrix} \begin{bmatrix} 1 \\ 1 \end{bmatrix} \right\},$$

wherein, in $\{u_{i_1}, u_{i_2}, i=0\sim 15\}$, 8 values of $u_{i_1}, u_{i_2}$ are $$\begin{bmatrix} 1 \\ 1 \end{bmatrix},$$

and 8 values of $u_{i_1}, u_{i_2}$ are $$\begin{bmatrix} 1 \\ j \end{bmatrix}$$

respectively.

The above terminal may further comprise the following features:

$$u_{i_1}, u_{i_2} \in \left\{ \begin{bmatrix} 1 \\ 1 \end{bmatrix} \begin{bmatrix} 1 \\ -1 \end{bmatrix} \begin{bmatrix} 1 \\ j \end{bmatrix} \begin{bmatrix} 1 \\ -j \end{bmatrix} \right\},$$

wherein, in $\{u_{i_1}, u_{i_2}, i=0\sim 15\}$, 6 values of $u_{i_1}$ are $$\begin{bmatrix} 1 \\ 1 \end{bmatrix},$$

2 values of $u_{i_1}$ are $$\begin{bmatrix} 1 \\ -1 \end{bmatrix},$$

6 values of $u_{i_1}$ are $$\begin{bmatrix} 1 \\ j \end{bmatrix},$$

and 2 values of $u_{i_1}$ are $$\begin{bmatrix} 1 \\ -j \end{bmatrix};$$

and 2 values of $u_{i_1}$ are $$\begin{bmatrix} 1 \\ 1 \end{bmatrix},$$

4 values of $u_{i_2}$ are $$\begin{bmatrix} 1 \\ -1 \end{bmatrix},$$

4 values of $u_{i_2}$ are $$\begin{bmatrix} 1 \\ j \end{bmatrix},$$

and 6 values of $u_{i_2}$ are $$\begin{bmatrix} 1 \\ -j \end{bmatrix}.$$

The above terminal may further comprise the following features:

$$u_{i_1}, u_{i_2} \in \left\{ \begin{bmatrix} 1 \\ 1 \end{bmatrix} \begin{bmatrix} 1 \\ e^{j\frac{\pi}{4}} \end{bmatrix} \begin{bmatrix} 1 \\ j \end{bmatrix} \begin{bmatrix} 1 \\ e^{j\frac{3\pi}{4}} \end{bmatrix} \begin{bmatrix} 1 \\ -1 \end{bmatrix} \begin{bmatrix} 1 \\ e^{j\frac{5\pi}{4}} \end{bmatrix} \begin{bmatrix} 1 \\ -j \end{bmatrix} \begin{bmatrix} 1 \\ e^{j\frac{7\pi}{4}} \end{bmatrix} \right\},$$

wherein, in $\{u_{i_1},u_{i_2}, i=0\sim15\}$, 2 values of $u_{i_1},u_{i_2}$ are $$\begin{bmatrix} 1 \\ 1 \end{bmatrix},$$

2 values of $u_{i_1},u_{i_2}$ are $$\begin{bmatrix} 1 \\ e^{j\frac{\pi}{4}} \end{bmatrix},$$

2 values of $u_{i_1},u_{i_2}$ are $$\begin{bmatrix} 1 \\ j \end{bmatrix},$$

2 values of $u_{i_1},u_{i_2}$ are $$\begin{bmatrix} 1 \\ e^{j\frac{3\pi}{4}} \end{bmatrix},$$

2 values of $u_{i_1},u_{i_2}$ are $$\begin{bmatrix} 1 \\ -1 \end{bmatrix},$$

2 values of $u_{i_1},u_{i_2}$ are $$\begin{bmatrix} 1 \\ e^{j\frac{5\pi}{4}} \end{bmatrix},$$

2 values of $u_{i_1},u_{i_2}$ are $$\begin{bmatrix} 1 \\ -j \end{bmatrix},$$

and 2 values of $u_{i_1},u_{i_2}$ in $\{u_{i_1},u_{i_2}, i=0\sim15\}$ are $$\begin{bmatrix} 1 \\ e^{j\frac{7\pi}{4}} \end{bmatrix}$$

respectively.

The above terminal may further comprise the following features: when RI=2, codewords indicated by the set of combination information comprise codewords of a second codebook corresponding to Rank2 in the LTE-A Rel12 version, and the codewords indicated by the set of combination information comply with a model $$\begin{bmatrix} u_{i_1} & u_{i_3} \\ e^{j\theta_m}u_{i_2} & e^{j\theta_n}u_{i_4} \end{bmatrix} i_1, i_2, i_3, i_4, m, n = 0 \sim 15,$$

wherein $\theta_m,\theta_n$ are any real numbers, and $u_i$ is a 2-dimensional column vector.

The above terminal may further comprise the following features: for all the $u_{i_1},u_{i_2},u_{i_3},u_{i_4}$, $i_2=i_1=i_4=i_3$; or $i_2=i_1$ and $i_4=i_3$, and one half of the codewords indicated by the set of combination information meet $i_2=i_1=i_4=i_3$, and the other half of the codewords meet $i_1 \neq i_3$; or all codewords indicated by the set of combination information meet $i_2=i_1$ and $i_4=i_3$, and the number of codewords which meet $i_2=i_1=i_4=i_3$ is more than the number of codewords which meet $i_1 \neq i_3$; or one half of codewords indicated by the set of combination information meet $i_2=i_1=i_4=i_3$, a quarter of the codewords meet $i_2=i_1$, $i_4=i_3$ and $i_1 \neq i_3$, and a quarter of the codewords meet $i_1=i_4$, $i_2=i_3$, and $i_1 \neq i_2$.

The embodiments of the present invention can reduce the overhead of the PMI feedback by joint encoding and can further ensure the accuracy of the PMI feedback with a limited overhead and obtain better precoding performance.

PREFERRED EMBODIMENTS OF THE PRESENT INVENTION

Figure 1:
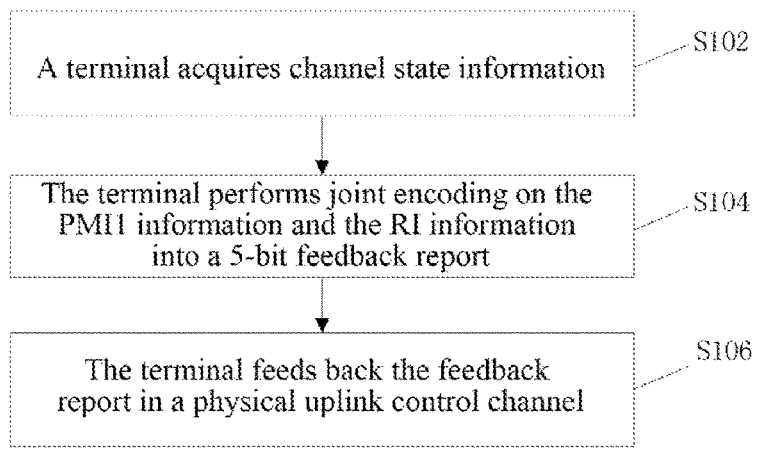
FIG. 1 is a diagram of a method for feeding back channel state information according to an embodiment of the present invention.

The embodiments of the present invention will be described in detail below in conjunction with accompanying drawings. It should be illustrated that without a conflict, the embodiments in the present application and the features in the embodiments can be combined with each other randomly.

In addition, although a logical order is illustrated in the flowchart, in some cases, the steps illustrated or described can be performed in an order different from here.

The embodiments of the present invention provide a method for feeding back channel state information, applied to a 4-antenna system, comprising:

a terminal acquiring channel information, the channel information comprising a first class of Precoding Matrix Indicator (PMI1) information and Rank Indicator (RI) information; the terminal performing joint encoding on the PMI1 information and the RI information into a 4-bit or 5-bit feedback report, wherein the feedback report is used for indicating one of a set of combination information formed by the RI information and the PMI1 information, and the set of combination information comprises:

combination information of information of RI=1 with M1 PMI1 respectively;

combination information of information of RI=2 with M2 PMI1 respectively;

combination information of information of RI=3 with one PMI1;

combination information of information of RI=4 with one PMI1;

wherein M1=M2=4, or M1=16 and M2=8, or M1=8 and M2=16, or M1=16 and M2=4, or M1=4 and M2=16; and the terminal feeding back the feedback report in a physical uplink control channel.

Alternatively, when RI=1 or RI=2, the 8 PMI1 indexes are $0^{th}$, $2^{nd}$, $4^{th}$, $6^{th}$, $8^{th}$, $10^{th}$, $12^{th}$ and $14^{th}$ codewords;

alternatively, when RI=1 or RI=2, the 4 PMI1 indexes are $0^{th}$, $4^{th}$, $8^{th}$ and $12^{th}$ codewords;

alternatively, when RI=1 or RI=2, the 4 PMI1 indexes are $0^{th}$, $2^{nd}$, $4^{th}$ and $6^{th}$ codewords;

alternatively, the 4 PMI1 indexes respectively corresponding to the extracted codewords when RI=1 and when RI=2 are the same, such as 0, 2, 4, 6, or 0, 4, 8, 12, or 0, 2, 4, 6, 8, 10, 12, 14;

alternatively, the 4 PMI1 indexes respectively corresponding to the extracted codewords when RI=1 and when RI=2 are not the same.

The embodiments of the present invention provide a method for feeding back channel state information, applied to a 4-antenna system, comprising: feeding back Rank Indicator (RI) information, a second class of Precoding Matrix Indicator (PMI2) information, subband indication information, and channel quality information in a physical uplink control channel. When RI=3 or 4, the PMI2 information comprises 2 bits, and indicates one codeword in the set X of codewords. The set X of codewords comprises:

using $0^{th}$, $1^{st}$, $2^{nd}$, and $3^{rd}$ codewords in the Rel-8 codebook indicated by the PMI2 indexes as a first group, using $8^{th}$, $9^{th}$, $10^{th}$, and $11^{th}$ codewords in the Rel-8 codebook indicated by the PMI2 indexes as a second group, and forming the 4 codewords by selecting 2 codewords from the first group and selecting 2 codewords from the second group; wherein the Rel-8 codebook in the present disclosure refers to the codebook defined in 3GPP TS 36.211 V8.9.0. Specifically, the 4 codewords indicated by the 4 PMI2 indexes are:

$8^{th}$, $9^{th}$, $10^{th}$, and $11^{th}$ codewords in the Rel-8 Rank3,4 codebook; or $12^{th}$, $13^{th}$, $14^{th}$, and $15^{th}$ codewords of the codebook corresponding to Ranks 3 and 4 in the Rel-8 codebook; or $0^{th}$, $2^{nd}$, $12^{th}$, and $14^{th}$ codewords of the codebook corresponding to Ranks 3 and 4 in the Rel-8 codebook; or $4^{th}$, $5^{nd}$, $6^{th}$, and $7^{th}$ codewords of the codebook corresponding to Ranks 3 and 4 in the Rel-8 codebook; or $0^{th}$, $1^{st}$, $2^{nd}$, and $3^{rd}$ codewords in the codebook corresponding to Ranks 3 and 4 in the Rel-8 codebook; or $0^{th}$, $1^{st}$, $3^{rd}$, and $10^{th}$ codewords in the codebook corresponding to Ranks 3 and 4 in the Rel-8 codebook; or $0^{th}$, $1^{st}$, $8^{th}$, and $11^{th}$ codewords in the codebook corresponding to Ranks 3 and 4 in the Rel-8 codebook; or $0^{th}$, $1^{st}$, $2^{nd}$ and $9^{th}$ codewords in the codebook corresponding to Ranks 3 and 4 in the Rel-8 codebook; or $1^{st}$, $3^{rd}$, $9^{th}$ and $11^{th}$ codewords in the codebook corresponding to Ranks 3 and 4 in the Rel-8 codebook; or $0^{th}$, $2^{nd}$, $8^{th}$ and $10^{th}$ codewords in the codebook corresponding to Ranks 3 and 4 in the Rel-8 codebook.

Alternatively, using $0^{th}$, $2^{nd}$, $8^{th}$ and $10^{th}$ codewords in the Rel-8 codebook indicated by the PMI2 indexes as a third group, using $1^{st}$, $3^{rd}$, $9^{th}$, and $11^{th}$ codewords in the Rel-8 codebook indicated by the PMI2 indexes as a fourth group, and forming the 4 codewords by selecting 2 codewords from the third group and selecting 2 codewords from the fourth group.

Alternatively, the 4 PMI2 indexes indicate $0^{th}$, $1^{st}$, $3^{rd}$, and $10^{th}$ codewords in the Rel-8 codebook.

Alternatively, the 4 PMI2 indexes indicate $3^{rd}$, $8^{th}$, $10^{th}$, and $11^{th}$ codewords in the Rel-8 codebook.

Alternatively, the 4 PMI2 indexes indicate $2^{nd}$, $9^{th}$, $8^{th}$, and $11^{th}$ codewords in the Rel-8 codebook.

Alternatively, using $0^{th}$, $2^{nd}$, $3^{rd}$ and $10^{th}$ codewords in the Rel-8 codebook indicated by the PMI2 indexes as a fifth group, using $2^{nd}$, $8^{th}$, $9^{th}$, and $11^{th}$ codewords in the Rel-8 codebook indicated by the PMI2 indexes as a sixth group, and forming the 4 codewords by selecting 2 codewords from the fifth group and selecting 2 codewords from the sixth group.

Alternatively, the 4 PMI2 indexes indicate $2^{nd}$, $3^{rd}$, $9^{th}$, and $10^{th}$ codewords in the Rel-8 codebook.

Alternatively, using $0^{th}$, $1^{st}$, $2^{nd}$ and $9^{th}$ codewords in the Rel-8 codebook indicated by the PMI2 indexes as a seventh group, using $3^{rd}$, $10^{th}$, $8^{th}$, and $11^{th}$ codewords in the Rel-8 codebook indicated by the PMI2 indexes as an eighth group, and forming the 4 codewords by selecting 2 codewords from the seventh group and selecting 2 codewords from the eighth group.

The 4 codewords and the 8 codewords are actually selected by selecting some elements from one large set to form one small set, which needs to have a better quantization efficiency, so as to obtain better performance with minimum information and acquire the tradeoff between the CSI quantization accuracy and the transmission link performance.

The embodiments of the present invention provide a method for feeding back channel state information, applied to a 4-antenna system, comprising: feeding back Rank Indicator (RI) information, a second class of Precoding Matrix Indicator (PMI2) information, subband indication information, and channel quality information in a physical uplink control channel. When RI=1 or 2, the PMI2 comprises 2 bits, and indicates one codeword in a set X of codewords. The set X of codewords comprises:

$0^{th}$, $1^{st}$, $2^{nd}$, and $3^{rd}$ codewords in the codebook of the table 4 or table 5-a or table 5-b indicated by the PMI2 indexes; or $0^{th}$, $1^{st}$, $8^{th}$, and $9^{th}$ codewords in the codebook of the table 4 or table 5-a or table 5-b indicated by the PMI2 indexes; or $0^{th}$, $4^{th}$, $8^{th}$, and $12^{th}$ codewords in the codebook of the table 4 or table 5-a or table 5-b indicated by the PMI2 indexes; or $0^{th}$, $4^{th}$, $5^{th}$, and $12^{th}$ codewords in the codebook of the table 4 or table 5-a or table 5-b indicated by the PMI2 indexes; or $0^{th}$, $1^{st}$, $4^{th}$, and $5^{th}$ codewords in the codebook of the table 4 or table 5-a or table 5-b indicated by the PMI2 indexes; or $12^{th}$, $13^{th}$, $14^{th}$, and $15^{th}$ codewords in the codebook of the table 4 or table 5-a or table 5-b indicated by the PMI2 indexes.

The embodiments of the present invention provide a method for feeding back channel state information, applied to a 4-antenna system, comprising: feeding back Rank Indicator (RI) information, a first class of Precoding Matrix Indicator (PMI1) information, and a second class of Precoding Matrix Indicator (PMI2) information in the physical uplink control channel. When RI=1, the terminal performs joint encoding on the PMI1 information and the PMI2 information into a 4-bit feedback report, and the feedback report is used for indicating one of a set of combination information formed by the PMI1 and the PMI2, and the PMI1 and the second PMI2 indicate codewords in the Rank1 codebook in the LTE-A Rel12 version; wherein the LTE-A Rel12 version in the present disclosure refers to 3GPP TS 36.213 V12.0.0. The codewords indicated by combination information are:

the codewords complying with a model $$\begin{bmatrix} u \\ e^{j\frac{m\pi}{4}} \cdot e^{j\frac{n\pi}{2}} \cdot u \end{bmatrix} m = 0, 1 \; n = 0, 1, 2, 3,$$

wherein u is a 2-dimensional column vector.

All codewords meet the model when m=0; or one half of the codewords meet the model when m=0, and the other half of the codewords meet the model when m=1; or all codewords fed back in the physical uplink control channel meet the model when m=1.

A set of codewords corresponding to the set of combination information of the PMI1 and the PMI2 is:

$$\begin{bmatrix} u_i \\ e^{j\theta_i} u_i \end{bmatrix} i = 0 \sim 15,$$

wherein $\theta_i$ is any real number, and $u_i$ is a 2-dimensional column vector.

$$u_i \in \left\{ \begin{bmatrix} 1 \\ 1 \end{bmatrix} \begin{bmatrix} 1 \\ -1 \end{bmatrix} \right\},$$

wherein, in $\{u_i, i=0\sim15\}$, 8 values are $$\begin{bmatrix} 1 \\ 1 \end{bmatrix},$$

and 8 values are $$\begin{bmatrix} 1 \\ -1 \end{bmatrix}; \text{ or } u_i \in \left\{ \begin{bmatrix} 1 \\ j \end{bmatrix} \begin{bmatrix} 1 \\ -j \end{bmatrix} \right\},$$

wherein, in $\{u_i, i=0\sim15\}$, 8 values are $$\begin{bmatrix} 1 \\ j \end{bmatrix},$$

and 8 values are $$\begin{bmatrix} 1 \\ -j \end{bmatrix}; \text{ or } u_i \in \left\{ \begin{bmatrix} 1 \\ 1 \end{bmatrix} \begin{bmatrix} 1 \\ j \end{bmatrix} \right\},$$

wherein, in $\{u_i, i=0\sim15\}$, 8 values are $$\begin{bmatrix} 1 \\ 1 \end{bmatrix},$$

and 8 values are $$\begin{bmatrix} 1 \\ j \end{bmatrix}; \text{ or } u_i \in \left\{ \begin{bmatrix} 1 \\ 1 \end{bmatrix} \begin{bmatrix} 1 \\ -1 \end{bmatrix} \begin{bmatrix} 1 \\ j \end{bmatrix} \begin{bmatrix} 1 \\ -j \end{bmatrix} \right\},$$

wherein, in $\{u_i, i=0\sim15\}$, 4 values are $$\begin{bmatrix} 1 \\ 1 \end{bmatrix},$$

4 values are $$\begin{bmatrix} 1 \\ -1 \end{bmatrix},$$

4 values are $$\begin{bmatrix} 1 \\ j \end{bmatrix},$$

and 4 values are $$\begin{bmatrix} 1 \\ -j \end{bmatrix}; \text{ or } u_i \in \left\{ \begin{bmatrix} 1 \\ 1 \end{bmatrix} \begin{bmatrix} 1 \\ e^{j\frac{\pi}{4}} \end{bmatrix} \begin{bmatrix} 1 \\ j \end{bmatrix} \begin{bmatrix} 1 \\ e^{j\frac{3\pi}{4}} \end{bmatrix} \begin{bmatrix} 1 \\ -1 \end{bmatrix} \begin{bmatrix} 1 \\ e^{j\frac{5\pi}{4}} \end{bmatrix} \begin{bmatrix} 1 \\ -j \end{bmatrix} \begin{bmatrix} 1 \\ e^{j\frac{7\pi}{4}} \end{bmatrix} \right\},$$

wherein, in $\{u_i, i=0\sim15\}$, 2 values are $$\begin{bmatrix} 1 \\ 1 \end{bmatrix},$$

2 values are $$\begin{bmatrix} 1 \\ e^{j\frac{\pi}{4}} \end{bmatrix},$$

2 values are $$\begin{bmatrix} 1 \\ j \end{bmatrix},$$

2 values are $$\begin{bmatrix} 1 \\ e^{j\frac{3\pi}{4}} \end{bmatrix},$$

2 values are $$\begin{bmatrix} 1 \\ -1 \end{bmatrix},$$

2 values are $$\begin{bmatrix} 1 \\ e^{j\frac{5\pi}{4}} \end{bmatrix},$$

2 values are $$\begin{bmatrix} 1 \\ -j \end{bmatrix},$$

and 2 values are $$\begin{bmatrix} 1 \\ e^{j\frac{7\pi}{4}} \end{bmatrix}.$$

Alternatively, $$u_i \in \left\{ \begin{bmatrix} 1 \\ 1 \end{bmatrix} \begin{bmatrix} 1 \\ -1 \end{bmatrix} \begin{bmatrix} 1 \\ j \end{bmatrix} \begin{bmatrix} 1 \\ -j \end{bmatrix} \right\},$$

in $\{u_i, i=0\sim15\}$, when 4 values of $u_i$ are $$\begin{bmatrix} 1 \\ 1 \end{bmatrix},$$

m=0, when 4 values of $u_i$ are $$\begin{bmatrix} 1 \\ -1 \end{bmatrix},$$

m=1, when 4 values of $u_i$ are $$\begin{bmatrix} 1 \\ j \end{bmatrix},$$

m=0, and when 4 values of $u_i$ are $$\begin{bmatrix} 1 \\ -j \end{bmatrix},$$

m=1.

Alternatively, $$u_i \in \left\{ \begin{bmatrix} 1 \\ 1 \end{bmatrix} \begin{bmatrix} 1 \\ e^{j\frac{\pi}{4}} \end{bmatrix} \begin{bmatrix} 1 \\ j \end{bmatrix} \begin{bmatrix} 1 \\ e^{j\frac{3\pi}{4}} \end{bmatrix} \begin{bmatrix} 1 \\ -1 \end{bmatrix} \begin{bmatrix} 1 \\ e^{j\frac{5\pi}{4}} \end{bmatrix} \begin{bmatrix} 1 \\ -j \end{bmatrix} \begin{bmatrix} 1 \\ e^{j\frac{7\pi}{4}} \end{bmatrix} \right\},$$

wherein, in $\{u_i, i=0\sim15\}$, when 2 values of $u_i$ are $$\begin{bmatrix} 1 \\ 1 \end{bmatrix},$$

m=0, when 2 values of $u_i$ are $$\begin{bmatrix} 1 \\ e^{j\frac{\pi}{4}} \end{bmatrix},$$

m=0, when 2 values of $u_i$ are $$\begin{bmatrix} 1 \\ j \end{bmatrix},$$

m=0, when 2 values of $u_i$ are $$\begin{bmatrix} 1 \\ e^{j\frac{3\pi}{4}} \end{bmatrix},$$

m=0, when 2 values of $u_i$ are $$\begin{bmatrix} 1 \\ -1 \end{bmatrix},$$

m=1, when 2 values of $u_i$ are $$\begin{bmatrix} 1 \\ e^{j\frac{5\pi}{4}} \end{bmatrix},$$

m=1, when 2 values of $u_i$ are $$\begin{bmatrix} 1 \\ -j \end{bmatrix},$$

m=1, and when 2 values of $u_i$ are $$\begin{bmatrix} 1 \\ e^{j\frac{7\pi}{4}} \end{bmatrix},$$

m=1.

When RI=2, the terminal performs joint encoding on the PMI1 information and the PMI2 information into a 4-bit feedback report; the feedback report is used for indicating one of a set of combination information formed by the PMI1 and the PMI2, and the PMI1 and the PMI2 indicate codewords in the codebook of table 5-a of the Rank2 in the LTE-A Rel12 version. The codewords indicated by combination information are characterized in that:

the codewords comply with a model $$\begin{bmatrix} u_{i_1} & u_{i_2} \\ e^{j\theta_m}u_{i_1} & -e^{j\theta_m}u_{i_2} \end{bmatrix} i_1, i_2, m = 0 \sim 15,$$

wherein $\theta_m$ may be any real number, and $u_i$ is a 2-dimensional column vector.

in the model, for all $i_1$ and $i_2$, $i_1=i_2$; or
in the codewords, one half of the codewords meet $i_2=i_1$, and the other half of the codewords meet $i_2 \neq i_1$.

$$u_{i_1}, u_{i_2} \in \left\{ \begin{bmatrix} 1 \\ 1 \end{bmatrix} \begin{bmatrix} 1 \\ -1 \end{bmatrix} \right\},$$

wherein, in $\{u_{i_1}, u_{i_2}, i=0\sim15\}$, 8 values of $u_{i_1}, u_{i_2}$ are $$\begin{bmatrix} 1 \\ 1 \end{bmatrix},$$

and 8 values of $u_{i_1}, u_{i_2}$ are $$\begin{bmatrix} 1 \\ -1 \end{bmatrix}$$

respectively; or $$u_{i_1}, u_{i_2} \in \left\{ \begin{bmatrix} 1 \\ j \end{bmatrix} \begin{bmatrix} 1 \\ -j \end{bmatrix} \right\},$$

wherein, in $\{u_{i_1}, u_{i_2}, i=0\sim15\}$, 8 values of $u_{i_1}, u_{i_2}$ are $$\begin{bmatrix} 1 \\ j \end{bmatrix},$$

and 8 values of $u_{i_1}, u_{i_2}$ are $$\begin{bmatrix} 1 \\ -j \end{bmatrix}$$

respectively; or $$u_{i_1}, u_{i_2} \in \left\{ \begin{bmatrix} 1 \\ j \end{bmatrix} \begin{bmatrix} 1 \\ 1 \end{bmatrix} \right\},$$

wherein, in $\{u_{i_1}, u_{i_2}, i=0\sim15\}$, 8 values of $u_{i_1}, u_{i_2}$ are $$\begin{bmatrix} 1 \\ 1 \end{bmatrix},$$

and 8 values of $u_{i_1}, u_{i_2}$ are $$\begin{bmatrix} 1 \\ j \end{bmatrix}$$

respectively; or $$u_{i_1}, u_{i_2} \in \left\{ \begin{bmatrix} 1 \\ 1 \end{bmatrix} \begin{bmatrix} 1 \\ -1 \end{bmatrix} \begin{bmatrix} 1 \\ j \end{bmatrix} \begin{bmatrix} 1 \\ -j \end{bmatrix} \right\},$$

wherein, in $\{u_{i_1}, u_{i_2}, i=0\sim15\}$, 6 values of $u_{i_1}$ are $$\begin{bmatrix} 1 \\ 1 \end{bmatrix},$$

2 values of $u_{i_1}$ are $$\begin{bmatrix} 1 \\ -1 \end{bmatrix},$$

6 values of $u_{i_1}$ are $$\begin{bmatrix} 1 \\ j \end{bmatrix},$$

and 2 values of $u_{i_1}$ are $$\begin{bmatrix} 1 \\ -j \end{bmatrix};$$

and 2 values of $u_{i_2}$ are $$\begin{bmatrix} 1 \\ 1 \end{bmatrix},$$

4 values of $u_{i_2}$ are $$\begin{bmatrix} 1 \\ -1 \end{bmatrix},$$

4 values of $u_{i_2}$ are $$\begin{bmatrix} 1 \\ j \end{bmatrix},$$

and 6 values of $u_{i_2}$ are $$\begin{bmatrix} 1 \\ -j \end{bmatrix}; \text{ or }$$

$$u_{i_1}, u_{i_2} \in \left\{ \begin{bmatrix} 1 \\ 1 \end{bmatrix} \begin{bmatrix} 1 \\ e^{j\frac{\pi}{4}} \end{bmatrix} \begin{bmatrix} 1 \\ j \end{bmatrix} \begin{bmatrix} 1 \\ e^{j\frac{3\pi}{4}} \end{bmatrix} \begin{bmatrix} 1 \\ -1 \end{bmatrix} \begin{bmatrix} 1 \\ e^{j\frac{5\pi}{4}} \end{bmatrix} \begin{bmatrix} 1 \\ -j \end{bmatrix} \begin{bmatrix} 1 \\ e^{j\frac{7\pi}{4}} \end{bmatrix} \right\},$$

wherein, in $\{u_{i_1}, u_{i_2}, i=0\sim15\}$, 2 values of $u_{i_1}, u_{i_2}$ are $$\begin{bmatrix} 1 \\ 1 \end{bmatrix},$$

2 values of $u_{i_1}, u_{i_2}$ are $$\begin{bmatrix} 1 \\ e^{j\frac{\pi}{4}} \end{bmatrix},$$

2 values of $u_{i_1}, u_{i_2}$ are $$\begin{bmatrix} 1 \\ j \end{bmatrix},$$

2 values of $u_{i_1}, u_{i_2}$ are $$\begin{bmatrix} 1 \\ e^{j\frac{3\pi}{4}} \end{bmatrix},$$

2 values of $u_{i_1}, u_{i_2}$ are $$\begin{bmatrix} 1 \\ -1 \end{bmatrix},$$

2 values of $u_{i_1}, u_{i_2}$ are $$\begin{bmatrix} 1 \\ e^{j\frac{5\pi}{4}} \end{bmatrix},$$

2 values of $u_{i_1}, u_{i_2}$ are $$\begin{bmatrix} 1 \\ -j \end{bmatrix},$$

and 2 values of $u_{i_1}, u_{i_2}$ are $$\begin{bmatrix} 1 \\ e^{j\frac{7\pi}{4}} \end{bmatrix}$$

respectively.

When RI=2, the terminal performs joint encoding on the PMI1 information and the PMI2 information into a 4-bit feedback report; the feedback report is used for indicating one of a set of combination information formed by the PMI1 and the PMI2, and the PMI1 and the PMI2 indicate codewords in the Rank2-b codebook in the LTE-A Rel12 version. The codewords indicated by combination information are characterized in that:

the codewords comply with a model $$\begin{bmatrix} u_{i_1} & u_{i_3} \\ e^{j\theta_m} u_{i_2} & e^{j\theta_n} u_{i_4} \end{bmatrix} i_1, i_2, i_3, i_4, m, n = 0 \sim 15,$$

wherein $\theta_m, \theta_n$ may be any real numbers, and $u_i$ is a 2-dimensional column vector.

For all the $u_{i_1}, u_{i_2}, u_{i_3}, u_{i_4}$ in the codeword model, $i_2=i_1=i_4=i_3$; or all codewords meet $i_2=i_1$ and $i_4=i_3$, and one half of the codewords meet $i_2=i_1=i_4=i_3$, and the other half of the codewords meet $i_1 \ne i_3$; or all codewords meet $i_2=i_1$ and $i_4=i_3$, and the number of codewords which meet $i_2=i_1=i_4=i_3$ is more than the number of codewords which meet $i_1 \ne i_3$; or one half of the codewords meet $i_2=i_1=i_4=i_3$, a quarter of the codewords meet $i_2=i_1$, $i_4=i_3$ and $i_1 \ne i_3$, and a quarter of the codewords meet $i_1=i_4$, $i_2=i_3$, and $i_1 \ne i_2$.

The embodiment provides a method for feeding back channel state information. FIG. 1 is a first flowchart of the channel feedback method according to the embodiment of the present invention. As shown in FIG. 1, the method comprises the following steps.

In step S102, a terminal acquires channel state information, wherein the channel state information comprises a first class of Precoding Matrix Indicator (PMI1) information and Rank Indicator (RI) information.

In step S104, the terminal performs joint encoding on the PMI1 information and the RI information into a 5-bit feedback report.

In step S106, the terminal feeds back the feedback report in a physical uplink control channel.

With the above steps, joint encoding is performed on the PMI1 and the RI in the channel state information, and the 5-bit feedback report is obtained and is fed back, which overcomes the problem in the related art that the transmission performance of the system is poor due to a large overhead of the feedback channel information, reduces the overhead of the channel information feedback, and improves performance of a terminal feeding back the channel information, thereby improving the transmission performance of the system. The above 5-bit feedback report is used for indicating one of a set of combination information formed by the RI information and the PMI1 information. The set comprises N elements, wherein N is more than 16 and less than or equal to 32.

Embodiment 1-1-1

Alternatively, the RI/PMI1 joint encoded set is shown in the following table 6:

TABLE 6

| | 5 bits in total, information of RI and a part of $i_1$ |
|---|---|
| 0-7 | RI = 1: 8 indexes of $i_1$ |
| 8-15 | RI = 2: 8 indexes of $i_1$ |
| 16 | RI = 3: 1 index of $i_1$ |
| 17 | RI = 4: 1 index of $i_1$ |

Embodiment 1-1-2

Alternatively, the RI/PMI1 joint encoded set is shown in the following table 7:

TABLE 7

| | 5 bits in total, information of RI and a part of $i_1$ |
|---|---|
| 0-15 | RI = 1: 16 indexes of $i_1$ |
| 16-23 | RI = 2: 8 indexes of $i_1$ |
| 24 | RI = 3: 1 index of $i_1$ |
| 25 | RI = 4: 1 index of $i_1$ |
| 26-31 | Reserved |

Embodiment 1-1-3

Alternatively, the RI/PMI1 joint encoded set is shown in the following table 8:

TABLE 8

| | 5 bits in total, information of RI and a part of $i_1$ |
|---|---|
| 0-7 | RI = 1: 8 indexes of $i_1$ |
| 8-23 | RI = 2: 16 indexes of $i_1$ |
| 24 | RI = 3: 1 index of $i_1$ |
| 25 | RI = 4: 1 index of $i_1$ |
| 26-31 | Reserved |

Figure 2:
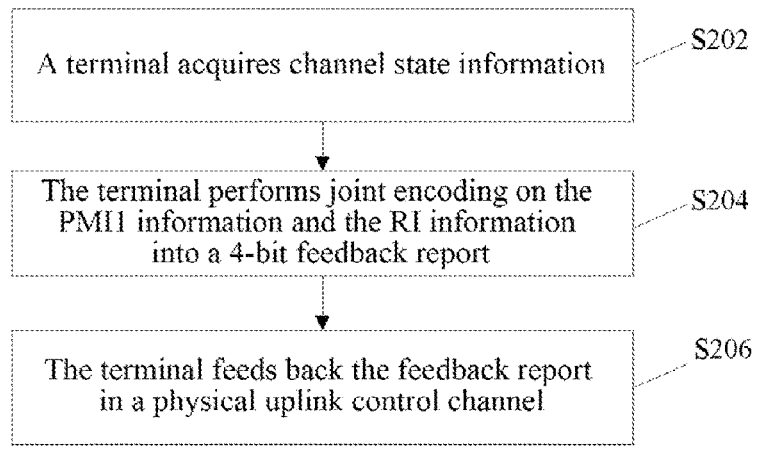
FIG. 2 is a diagram of a method for feeding back channel state information according to an embodiment of the present invention.

Alternatively, joint encoding may also be performed on the PMI1 and the RI in the channel information, and a 4-bit feedback report is obtained and is fed back, which comprises the following steps, as shown in FIG. 2.

In step S202, a terminal acquires channel state information, the channel state information comprising PMI1 information and RI information.

In step S204, the terminal performs joint encoding on the PMI1 information and the RI information into a 4-bit feedback report.

In step S206, the terminal feeds back the feedback report in a physical uplink control channel.

The above 4-bit feedback report is used for indicating one of a set of combination information formed by the RI information and the PMI1. The set comprises N elements, wherein N is more than 8 and less than or equal to 16.

The above steps overcome the problem in the related art that the transmission performance of the system is poor due to a large overhead of the feedback channel information, reduces the overhead of the channel information feedback, and improves performance of a terminal feeding back the channel information, thereby improving the transmission performance of the system. The N elements are actually selected by selecting some elements from one large set to form one small set, which needs to have a better quantization efficiency, so as to obtain better performance with minimum information and acquire the tradeoff between the CSI quantization accuracy and the transmission link performance.

The following is specific embodiments when codewords are extracted specifically.

Embodiment 1-1

The joint encoding table is as follows:

TABLE 9

| $I_{RI/PMI1}$ | RI | Codebook index $i_1$ |
|---|---|---|
| 0-3 | 1 | 0, 4, 8, 12 |
| 4-7 | 2 | 0, 4, 8, 12 |
| 8 | 3 | 0 |
| 9 | 4 | 0 |
| 10-15 | Reserved | NA |

Values of a joint encoding table are as follows: by taking a first row as an example, when the value of the feedback report is 0, RI=1 and $i_1$=0; when the value of the feedback report is 1, RI=1 and $i_1$=4; when the value of the feedback report is 2, RI=1 and $i_1$=8; and when the value of the feedback report is 3, RI=1 and $i_1$=12.

Embodiment 1-2

The joint encoding table is as follows:

TABLE 10

| $I_{RI/PMI1}$ | RI | Codebook index $i_1$ |
|---|---|---|
| 0-3 | 1 | 0, 2, 4, 6 |
| 4-7 | 2 | 0, 2, 4, 6 |
| 8 | 3 | 0 |
| 9 | 4 | 0 |
| 10-15 | Reserved | NA |

Embodiment 1-3

The joint encoding table is as follows:

TABLE 11

| $I_{RI/PMI1}$ | RI | Codebook index $i_1$ |
|---|---|---|
| 0-7 | 1 | 0, 2, 4, 6, 8, 10, 12, 14 |
| 8-15 | 2 | 0, 2, 4, 6, 8, 10, 12, 14 |
| 16 | 3 | 0 |
| 17 | 4 | 0 |
| 18-31 | Reserved | NA |

Embodiment 1-4

The joint encoding table is as follows:

TABLE 12

| $I_{RI/PMI1}$ | RI | Codebook index $i_1$ |
|---|---|---|
| 0-15 | 1 | 0-15 |
| 16-23 | 2 | 0, 2, 4, 6, 8, 10, 12, 14 |

TABLE 12-continued

| $I_{RI/PMI1}$ | RI | Codebook index $i_1$ |
|---|---|---|
| 24 | 3 | 0 |
| 25 | 4 | 0 |
| 26-31 | Reserved | NA |

Embodiment 1-5

The joint encoding table is as follows:

TABLE 13

| $I_{RI/PMI1}$ | RI | Codebook index $i_1$ |
|---|---|---|
| 0-7 | 1 | 0, 2, 4, 6, 8, 10, 12, 14 |
| 8-23 | 2 | 0-15 |
| 24 | 3 | 0 |
| 25 | 4 | 0 |
| 26-31 | Reserved | NA |

Embodiment 1-6

The joint encoding table is as follows:

TABLE 14

| $I_{RI/PMI1}$ | RI | Codebook index $i_1$ |
|---|---|---|
| 0-3 | 1 | 0, 4, 8, 12 |
| 4-7 | 2 | 0, 2, 4, 6 |
| 8 | 3 | 0 |
| 9 | 4 | 0 |
| 10-15 | Reserved | NA |

Embodiment 1-7

The joint encoding table is as follows:

TABLE 15

| $I_{RI/PMI1}$ | RI | Codebook index $i_1$ |
|---|---|---|
| 0-3 | 1 | 0, 2, 4, 6 |
| 4-7 | 2 | 0, 4, 8, 12 |
| 8 | 3 | 0 |
| 9 | 4 | 0 |
| 10-15 | Reserved | NA |

Embodiment 1-8

The joint encoding table is as follows:

TABLE 16

| $I_{RI/PMI1}$ | RI | Codebook index $i_1$ |
|---|---|---|
| 0-7 | 1 | 0, 2, 4, 6, 8, 10, 12, 14 |
| 8-11 | 2 | 0, 4, 8, 12 |
| 12 | 3 | 0 |
| 13 | 4 | 0 |
| 14-15 | Reserved | NA |

Embodiment 1-9

The joint encoding table is as follows:

TABLE 17

| $I_{RI/PMI1}$ | RI | Codebook index $i_1$ |
|---|---|---|
| 0-3 | 1 | 0, 2, 4, 6 |
| 4-11 | 2 | 0, 2, 4, 6, 8, 10, 12, 14 |
| 12 | 3 | 0 |
| 13 | 4 | 0 |
| 14-15 | Reserved | NA |

Embodiment 1-10

The joint encoding table is as follows:

TABLE 18

| $I_{RI/PMI1}$ | RI | Codebook index $i_1$ |
|---|---|---|
| 0-7 | 1 | 0, 2, 4, 6, 8, 10, 12, 14 |
| 8-11 | 2 | 0, 2, 4, 6 |
| 12 | 3 | 0 |
| 13 | 4 | 0 |
| 14-15 | Reserved | NA |

Embodiment 1-11

The joint encoding table is as follows:

TABLE 19

| $I_{RI/PMI1}$ | RI | Codebook index $i_1$ |
|---|---|---|
| 0-3 | 1 | 0, 4, 8, 12 |
| 4-11 | 2 | 0, 2, 4, 6, 8, 10, 12, 14 |
| 12 | 3 | 0 |
| 13 | 4 | 0 |
| 14-15 | Reserved | NA |

Figure 3:
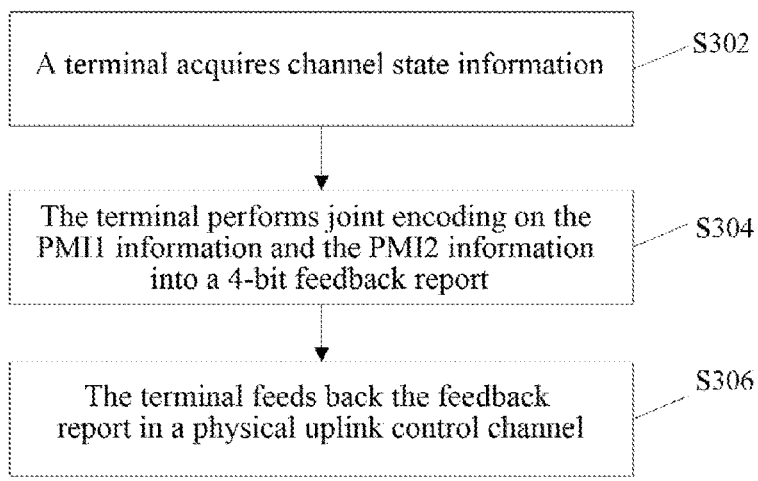
FIG. 3 is a diagram of a method for feeding back channel state information according to an embodiment of the present invention.

The embodiment provides a method for feeding back channel state information, which comprises the following steps, as shown in FIG. 3.

In step S302, a terminal acquires channel information, the channel information comprising a first class of Precoding Matrix Indicator (PMI1) information and a second class of Precoding Matrix Indicator (PMI2) information.

In step S304, the terminal performs joint encoding on the PMI1 information and the PMI2 information into a 4-bit feedback report.

In step S306, the terminal feeds back the feedback report in a physical uplink control channel.

With the method, the overhead of the PMI1 and the PMI2 can be effectively reduced, and it can be ensured that the performance will not be reduced significantly.

The 4-bit feedback report corresponds to 16 combinations of the PMI1 and the PMI2. The combination of the PMI1 and the PMI2 corresponds to codewords in the LTE-A Rel 12.

When RI=1, the embodiment is described as follows.

Embodiment 2-1-1

TABLE 20

| RI | $I_{PMI1}$ | Relationship between PMI1 and the codebook index $i_1$ — Codebook index $i_1$ | $I_{PMI2}$ | Relationship between PMI2 and the codebook index $i_2$ — Codebook index $i_2$ |
|---|---|---|---|---|
| 1 | 0-3 | 0, 4, 8, 12 | 0-3 | 0, 2, 9, 11/0, 2, 8, 10 |

Embodiment 2-1-2

TABLE 21

| RI | $I_{PMI1}$ | Relationship between PMI1 and the codebook index $i_1$ — Codebook index $i_1$ | $I_{PMI2}$ | Relationship between PMI2 and the codebook index $i_2$ — Codebook index $i_2$ |
|---|---|---|---|---|
| 1 | 0-1 | 0, 4 | 0-7 | 0, 2, 4, 6, 9, 11, 13, 15/ 0, 2, 4, 6, 8, 10, 12, 14/0, 1, 2, 3, 8, 9, 10, 11 |

Embodiment 2-1-3

TABLE 22

| RI | $I_{PMI1}$ | Relationship between PMI1 and the codebook index $i_1$ — Codebook index $i_1$ | $I_{PMI2}$ | Relationship between PMI2 and the codebook index $i_2$ — Codebook index $i_2$ |
|---|---|---|---|---|
| 1 | 0-1 | 0, 8 | 0-7 | 0, 1, 2, 3, 8, 9, 10, 11 |

Embodiment 2-1-4

TABLE 23

| RI | $I_{PMI1}$ | Relationship between PMI1 and the codebook index $i_1$ — Codebook index $i_1$ | $I_{PMI1}$ | Relationship between PMI2 and the codebook index $i_2$ — Codebook index $i_2$ |
|---|---|---|---|---|
| 1 | 0-1 | 0, 8 | 0-7 | 0, 1, 2, 3, 8, 9, 10, 11 |

Embodiment 2-1-5

TABLE 24

| RI | $I_{PMI1}$ | Relationship between PMI1 and the codebook index $i_1$ — Codebook index $i_1$ | $I_{PMI2}$ | Relationship between PMI2 and the codebook index $i_2$ — Codebook index $i_2$ |
|---|---|---|---|---|
| 1 | 0 | 0 | 0-15 | 0-15 |

For the condition of Rank2, the embodiment is described as follows.

Embodiment 2-2-1

TABLE 25

| RI | $I_{PMI1}$ | Relationship between PMI1 and the codebook index $i_1$ — Codebook index $i_1$ | $I_{PMI2}$ | Relationship between PMI2 and the codebook index $i_2$ — Codebook index $i_2$ |
|---|---|---|---|---|
| 2 | 0 | 0 | 0-15 | 0-15 |

Embodiment 2-2-2

TABLE 26

| RI | $I_{PMI1}$ | Relationship between PMI1 and the codebook index $i_1$ — Codebook index $i_1$ | $I_{PMI2}$ | Relationship between PMI2 and the codebook index $i_2$ — Codebook index $i_2$ |
|---|---|---|---|---|
| 2 | 0 | 8 | 0-15 | 0-15 |

Embodiment 2-2-3

TABLE 27

| RI | $I_{PMI1}$ | Relationship between PMI1 and the codebook index $i_1$ — Codebook index $i_1$ | $I_{PMI2}$ | Relationship between PMI2 and the codebook index $i_2$ — Codebook index $i_2$ |
|---|---|---|---|---|
| 2 | 0-1 | 0, 4 | 0-7 | 0, 1, 2, 3, 4, 5, 6, 7 |

Figure 4:
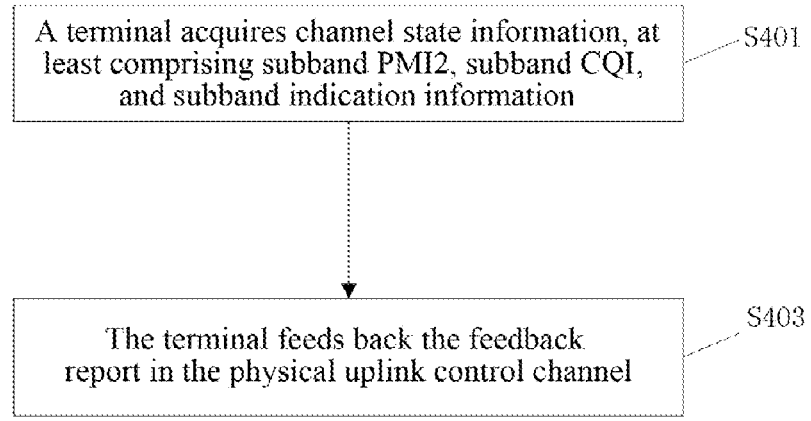
FIG. 4 is a diagram of a method for feeding back channel state information according to an embodiment of the present invention.

The embodiments of the present invention further provide a method for feeding back channel state information, which comprises the following steps, as shown in FIG. 4.

In step S401, a terminal acquires channel information, wherein the channel information at least comprises a second class of Precoding Matrix Indicator (PMI2) information and Channel Quality Information (CQI) corresponding to a subband and subband position indication information; and the terminal generates a feedback report and the PMI2 occupies 2 bits;

In step S403, the terminal feeds back the feedback report in the physical uplink control channel.

With the above steps, when a subband PMI2 is fed back, some codewords only are extracted from the original codebook to form a new codebook for quantizing the feedback; and during Ranks 3 and 4, the overhead corresponding to the feedback of the subband PMI2 is merely 2 bits, and the corresponding 4 codewords are described in the following embodiments.

Embodiment 3-1

When the codewords included in the Rank3,4 codebook are codewords in the Rel-8 Rank3,4 codebook illustrated in table 2, preferably, the 4 codewords extracted therefrom may be as follows.

TABLE 28

|   |         | Rank3 codewords | Rank4 codewords |
|---|---------|-----------------|-----------------|
| 0 | PMI2 is 0 | $\begin{bmatrix} 1 & 1 & 1 \\ 1 & 1 & -1 \\ 1 & -1 & -1 \\ 1 & -1 & 1 \end{bmatrix}$ | $\begin{bmatrix} 1 & 1 & 1 & 1 \\ 1 & 1 & -1 & -1 \\ 1 & -1 & 1 & -1 \\ 1 & -1 & -1 & 1 \end{bmatrix}$ |
| 1 | PMI2 is 1 | $\begin{bmatrix} 1 & -j & -1 \\ j & 1 & j \\ -1 & -j & 1 \\ -j & 1 & -j \end{bmatrix}$ | $\begin{bmatrix} 1 & -j & -1 & j \\ j & 1 & j & 1 \\ -1 & -j & 1 & j \\ -j & 1 & -j & 1 \end{bmatrix}$ |
| 2 | PMI2 is 2 | $\begin{bmatrix} 1 & -1 & 1 \\ -1 & 1 & 1 \\ 1 & 1 & 1 \\ -1 & -1 & 1 \end{bmatrix}$ | $\begin{bmatrix} 1 & -1 & 1 & -1 \\ 1 & 1 & -1 & -1 \\ 1 & 1 & 1 & 1 \\ 1 & -1 & -1 & 1 \end{bmatrix}$ |
| 3 | PMI2 is 9 | $\begin{bmatrix} 1 & 1 & -j \\ j & -j & -1 \\ 1 & 1 & j \\ j & -j & 1 \end{bmatrix}$ | $\begin{bmatrix} 1 & -j & 1 & -j \\ j & 1 & -j & -1 \\ 1 & j & 1 & j \\ j & -1 & -j & 1 \end{bmatrix}$ |

Embodiment 3-2

When the codewords included in the Rank3,4 codebook are codewords in the Rel-8 Rank3,4 codebook illustrated in table 2, preferably, the 4 codewords extracted therefrom may be as follows.

TABLE 29

|   |         | Rank3 codewords | Rank4 codewords |
|---|---------|-----------------|-----------------|
| 0 | PMI2 is 1 | $\begin{bmatrix} 1 & -j & -1 \\ j & 1 & j \\ -1 & -j & 1 \\ -j & 1 & -j \end{bmatrix}$ | $\begin{bmatrix} 1 & -j & -1 & j \\ j & 1 & j & 1 \\ -1 & -j & 1 & j \\ -j & 1 & -j & 1 \end{bmatrix}$ |
| 1 | PMI2 is 3 | $\begin{bmatrix} 1 & j & -1 \\ -j & 1 & -j \\ -1 & j & 1 \\ j & 1 & j \end{bmatrix}$ | $\begin{bmatrix} 1 & j & -1 & -j \\ -j & 1 & -j & 1 \\ -1 & j & 1 & -j \\ j & 1 & j & 1 \end{bmatrix}$ |
| 2 | PMI2 is 9 | $\begin{bmatrix} 1 & 1 & -j \\ j & -j & -1 \\ 1 & 1 & j \\ j & -j & 1 \end{bmatrix}$ | $\begin{bmatrix} 1 & -j & 1 & -j \\ j & 1 & -j & -1 \\ 1 & j & 1 & j \\ j & -1 & -j & 1 \end{bmatrix}$ |
| 3 | PMI2 is 11 | $\begin{bmatrix} 1 & 1 & j \\ -j & j & -1 \\ 1 & 1 & -j \\ -j & j & 1 \end{bmatrix}$ | $\begin{bmatrix} 1 & j & 1 & j \\ -j & 1 & j & -1 \\ 1 & -j & 1 & -j \\ -j & -1 & j & 1 \end{bmatrix}$ |

Embodiment 3-3

When the codewords included in the Rank3,4 codebook are codewords in the Rel-8 Rank3,4 codebook illustrated in table 2, preferably, the 4 codewords extracted therefrom may be as follows.

TABLE 30

|   |         | Rank3 codewords | Rank4 codewords |
|---|---------|-----------------|-----------------|
| 0 | PMI2 is 0 | $\begin{bmatrix} 1 & 1 & 1 \\ 1 & 1 & -1 \\ 1 & -1 & -1 \\ 1 & -1 & 1 \end{bmatrix}$ | $\begin{bmatrix} 1 & 1 & 1 & 1 \\ 1 & 1 & -1 & -1 \\ 1 & -1 & 1 & -1 \\ 1 & -1 & -1 & 1 \end{bmatrix}$ |
| 1 | PMI2 is 2 | $\begin{bmatrix} 1 & -1 & 1 \\ -1 & 1 & 1 \\ 1 & 1 & 1 \\ -1 & -1 & 1 \end{bmatrix}$ | $\begin{bmatrix} 1 & -1 & 1 & -1 \\ 1 & 1 & -1 & -1 \\ 1 & 1 & 1 & 1 \\ 1 & -1 & -1 & 1 \end{bmatrix}$ |
| 2 | PMI2 is 8 | $\begin{bmatrix} 1 & 1 & -1 \\ 1 & 1 & 1 \\ -1 & 1 & -1 \\ -1 & 1 & 1 \end{bmatrix}$ | $\begin{bmatrix} 1 & 1 & -1 & -1 \\ 1 & 1 & 1 & 1 \\ -1 & 1 & 1 & -1 \\ -1 & 1 & -1 & 1 \end{bmatrix}$ |
| 3 | PMI2 is 10 | $\begin{bmatrix} 1 & -1 & -1 \\ -1 & 1 & -1 \\ -1 & -1 & 1 \\ 1 & 1 & 1 \end{bmatrix}$ | $\begin{bmatrix} 1 & -1 & -1 & 1 \\ -1 & -1 & 1 & 1 \\ -1 & 1 & -1 & 1 \\ 1 & 1 & 1 & 1 \end{bmatrix}$ |

Embodiment 3-4

When the codewords included in the Rank3,4 codebook are codewords in the Rel-8 Rank3,4 codebook illustrated in table 2, preferably, the 4 codewords extracted therefrom may be as follows.

TABLE 31

|   |         | Rank3 codewords | Rank4 codewords |
|---|---------|-----------------|-----------------|
| 0 | PMI2 is 0 | $\begin{bmatrix} 1 & 1 & 1 \\ 1 & 1 & -1 \\ 1 & -1 & -1 \\ 1 & -1 & 1 \end{bmatrix}$ | $\begin{bmatrix} 1 & 1 & 1 & 1 \\ 1 & 1 & -1 & -1 \\ 1 & -1 & 1 & -1 \\ 1 & -1 & -1 & 1 \end{bmatrix}$ |
| 1 | PMI2 is 1 | $\begin{bmatrix} 1 & -j & -1 \\ j & 1 & j \\ -1 & -j & 1 \\ -j & 1 & -j \end{bmatrix}$ | $\begin{bmatrix} 1 & -j & -1 & j \\ j & 1 & j & 1 \\ -1 & -j & 1 & j \\ -j & 1 & -j & 1 \end{bmatrix}$ |

TABLE 31-continued

| | | Rank3 codewords | Rank4 codewords |
|---|---|---|---|
| 2 | PMI2 is 3 | $\begin{bmatrix} 1 & j & -1 \\ -j & 1 & -j \\ -1 & j & 1 \\ j & 1 & j \end{bmatrix}$ | $\begin{bmatrix} 1 & j & -1 & -j \\ -j & 1 & -j & 1 \\ -1 & j & 1 & -j \\ j & 1 & j & 1 \end{bmatrix}$ |
| 3 | PMI2 is 10 | $\begin{bmatrix} 1 & -1 & -1 \\ -1 & 1 & -1 \\ -1 & -1 & 1 \\ 1 & 1 & 1 \end{bmatrix}$ | $\begin{bmatrix} 1 & -1 & -1 & 1 \\ -1 & -1 & 1 & 1 \\ -1 & 1 & -1 & 1 \\ 1 & 1 & 1 & 1 \end{bmatrix}$ |

Embodiment 3-5

When the codewords included in the Rank3,4 codebook are codewords in the Rel-8 Rank3,4 codebook illustrated in table 2, preferably, the 4 codewords extracted therefrom may be as follows.

TABLE 32

| | | Rank3 codewords | Rank4 codewords |
|---|---|---|---|
| 0 | PMI2 is 2 | $\begin{bmatrix} 1 & -1 & 1 \\ -1 & 1 & 1 \\ 1 & 1 & 1 \\ -1 & -1 & 1 \end{bmatrix}$ | $\begin{bmatrix} 1 & -1 & 1 & -1 \\ 1 & 1 & -1 & -1 \\ 1 & 1 & 1 & 1 \\ 1 & -1 & -1 & 1 \end{bmatrix}$ |
| 1 | PMI2 is 8 | $\begin{bmatrix} 1 & 1 & -1 \\ 1 & 1 & 1 \\ -1 & 1 & -1 \\ -1 & 1 & 1 \end{bmatrix}$ | $\begin{bmatrix} 1 & 1 & -1 & -1 \\ 1 & 1 & 1 & 1 \\ -1 & 1 & 1 & -1 \\ -1 & 1 & -1 & 1 \end{bmatrix}$ |
| 2 | PMI2 is 9 | $\begin{bmatrix} 1 & 1 & -j \\ j & -j & -1 \\ 1 & 1 & j \\ j & -j & 1 \end{bmatrix}$ | $\begin{bmatrix} 1 & -j & 1 & -j \\ j & 1 & -j & -1 \\ 1 & j & 1 & j \\ j & -1 & -j & 1 \end{bmatrix}$ |
| 3 | PMI2 is 11 | $\begin{bmatrix} 1 & 1 & j \\ -j & j & -1 \\ 1 & 1 & -j \\ -j & j & 1 \end{bmatrix}$ | $\begin{bmatrix} 1 & 1 & j & j \\ -j & j & 1 & -1 \\ 1 & 1 & -j & -j \\ -j & j & -1 & 1 \end{bmatrix}$ |

Embodiment 3-6

When the codewords included in the Rank3,4 codebook are codewords in the Rel-8 Rank3,4 codebook illustrated in table 2, preferably, the 4 codewords extracted therefrom may be as follows.

TABLE 33

| | | Rank3 codewords | Rank4 codewords |
|---|---|---|---|
| 0 | PMI2 is 2 | $\begin{bmatrix} 1 & -1 & 1 \\ -1 & 1 & 1 \\ 1 & 1 & 1 \\ -1 & -1 & 1 \end{bmatrix}$ | $\begin{bmatrix} 1 & -1 & 1 & -1 \\ 1 & 1 & -1 & -1 \\ 1 & 1 & 1 & 1 \\ 1 & -1 & -1 & 1 \end{bmatrix}$ |

TABLE 33-continued

| | | Rank3 codewords | Rank4 codewords |
|---|---|---|---|
| 1 | PMI2 is 3 | $\begin{bmatrix} 1 & j & -1 \\ -j & 1 & -j \\ -1 & j & 1 \\ j & 1 & j \end{bmatrix}$ | $\begin{bmatrix} 1 & j & -1 & -j \\ -j & 1 & -j & 1 \\ -1 & j & 1 & -j \\ j & 1 & j & 1 \end{bmatrix}$ |
| 2 | PMI2 is 9 | $\begin{bmatrix} 1 & 1 & -j \\ j & -j & -1 \\ 1 & 1 & j \\ j & -j & 1 \end{bmatrix}$ | $\begin{bmatrix} 1 & -j & 1 & -j \\ j & 1 & -j & -1 \\ 1 & j & 1 & j \\ j & -1 & -j & 1 \end{bmatrix}$ |
| 3 | PMI2 is 10 | $\begin{bmatrix} 1 & -1 & -1 \\ -1 & 1 & -1 \\ -1 & -1 & 1 \\ 1 & 1 & 1 \end{bmatrix}$ | $\begin{bmatrix} 1 & -1 & -1 & 1 \\ -1 & -1 & 1 & 1 \\ -1 & 1 & -1 & 1 \\ 1 & 1 & 1 & 1 \end{bmatrix}$ |

Embodiment 3-7

When the codewords included in the Rank3,4 codebook are codewords in the Rel-8 Rank3,4 codebook illustrated in table 2, preferably, the 4 codewords extracted therefrom may be as follows.

TABLE 34

| | | Rank3 codewords | Rank4 codewords |
|---|---|---|---|
| 0 | PMI2 is 0 | $\begin{bmatrix} 1 & 1 & 1 \\ 1 & 1 & -1 \\ 1 & -1 & -1 \\ 1 & -1 & 1 \end{bmatrix}$ | $\begin{bmatrix} 1 & 1 & 1 & 1 \\ 1 & 1 & -1 & -1 \\ 1 & -1 & 1 & -1 \\ 1 & -1 & -1 & 1 \end{bmatrix}$ |
| 1 | PMI2 is 1 | $\begin{bmatrix} 1 & -j & -1 \\ j & 1 & j \\ -1 & -j & 1 \\ j & 1 & -j \end{bmatrix}$ | $\begin{bmatrix} 1 & -j & -1 & j \\ j & 1 & j & 1 \\ -1 & -j & 1 & j \\ -j & 1 & -j & 1 \end{bmatrix}$ |
| 2 | PMI2 is 2 | $\begin{bmatrix} 1 & -1 & 1 \\ -1 & 1 & 1 \\ 1 & 1 & 1 \\ -1 & -1 & 1 \end{bmatrix}$ | $\begin{bmatrix} 1 & -1 & 1 & -1 \\ 1 & 1 & -1 & -1 \\ 1 & 1 & 1 & 1 \\ 1 & -1 & -1 & 1 \end{bmatrix}$ |
| 3 | PMI2 is 3 | $\begin{bmatrix} 1 & j & -1 \\ -j & 1 & -j \\ -1 & j & 1 \\ j & 1 & j \end{bmatrix}$ | $\begin{bmatrix} 1 & j & -1 & -j \\ -j & 1 & -j & 1 \\ -1 & j & 1 & -j \\ j & 1 & j & 1 \end{bmatrix}$ |

Embodiment 3-8

When the codewords included in the Rank3,4 codebook are codewords in the Rel-8 Rank3,4 codebook illustrated in table 2, preferably, the 4 codewords extracted therefrom may be as follows.

TABLE 35

| | | Rank3 codewords | Rank4 codewords |
|---|---|---|---|
| 0 | PMI2 is 8 | $\begin{bmatrix} 1 & 1 & -1 \\ 1 & 1 & 1 \\ -1 & 1 & -1 \\ -1 & 1 & 1 \end{bmatrix}$ | $\begin{bmatrix} 1 & 1 & -1 & -1 \\ 1 & 1 & 1 & 1 \\ -1 & 1 & 1 & -1 \\ -1 & 1 & -1 & 1 \end{bmatrix}$ |
| 1 | PMI2 is 9 | $\begin{bmatrix} 1 & 1 & -j \\ j & -j & -1 \\ 1 & 1 & j \\ j & -j & 1 \end{bmatrix}$ | $\begin{bmatrix} 1 & -j & 1 & -j \\ j & 1 & -j & -1 \\ 1 & j & 1 & j \\ j & -1 & -j & 1 \end{bmatrix}$ |
| 2 | PMI2 is 10 | $\begin{bmatrix} 1 & -1 & -1 \\ -1 & 1 & -1 \\ -1 & -1 & 1 \\ 1 & 1 & 1 \end{bmatrix}$ | $\begin{bmatrix} 1 & -1 & -1 & 1 \\ -1 & -1 & 1 & 1 \\ -1 & 1 & -1 & 1 \\ 1 & 1 & 1 & 1 \end{bmatrix}$ |
| 3 | PMI2 is 11 | $\begin{bmatrix} 1 & 1 & j \\ -j & j & -1 \\ 1 & 1 & -j \\ -j & j & 1 \end{bmatrix}$ | $\begin{bmatrix} 1 & 1 & j & j \\ -j & j & 1 & -1 \\ 1 & 1 & -j & -j \\ -j & j & -1 & 1 \end{bmatrix}$ |

Embodiment 3-9

When the codewords included in the Rank3,4 codebook are codewords in the Rel-8 Rank3,4 codebook illustrated in table 2, preferably, the 4 codewords extracted therefrom may be as follows.

TABLE 36

| | | Rank3 codewords | Rank4 codewords |
|---|---|---|---|
| 0 | PMI2 is 12 | $\begin{bmatrix} 1 & 1 & 1 \\ 1 & 1 & -1 \\ 1 & -1 & 1 \\ -1 & 1 & 1 \end{bmatrix}$ | $\begin{bmatrix} 1 & 1 & 1 & -1 \\ 1 & 1 & -1 & 1 \\ 1 & -1 & 1 & 1 \\ -1 & 1 & 1 & 1 \end{bmatrix}$ |
| 1 | PMI2 is 13 | $\begin{bmatrix} 1 & 1 & -1 \\ 1 & 1 & 1 \\ -1 & 1 & 1 \\ 1 & -1 & 1 \end{bmatrix}$ | $\begin{bmatrix} 1 & 1 & -1 & 1 \\ 1 & 1 & 1 & -1 \\ -1 & 1 & 1 & 1 \\ 1 & -1 & 1 & 1 \end{bmatrix}$ |
| 2 | PMI2 is 14 | $\begin{bmatrix} 1 & -1 & 1 \\ -1 & 1 & 1 \\ 1 & 1 & 1 \\ 1 & 1 & -1 \end{bmatrix}$ | $\begin{bmatrix} 1 & -1 & 1 & 1 \\ 1 & 1 & -1 & 1 \\ 1 & 1 & 1 & -1 \\ -1 & 1 & 1 & 1 \end{bmatrix}$ |
| 3 | PMI2 is 15 | $\begin{bmatrix} 1 & -1 & -1 \\ -1 & 1 & -1 \\ -1 & -1 & 1 \\ -1 & -1 & -1 \end{bmatrix}$ | $\begin{bmatrix} 1 & -1 & -1 & -1 \\ -1 & 1 & -1 & -1 \\ -1 & -1 & 1 & -1 \\ -1 & -1 & -1 & 1 \end{bmatrix}$ |

The codebooks obtained by multiplying the codewords of Rank1, Rank2, Rank3, and Rank4 by any non-zero complex number are equivalent to the codebooks before the change.

The codebooks formed by performing any column exchange on the codewords of the Rank1, Rank2, Rank3 and Rank4, and multiplying the codewords by a constant coefficient, or performing row exchange on all codewords, are equivalent to the codebooks before the change.

The codebooks obtained by multiplying any column in the codewords of Rank1, Rank2, Rank3 and Rank4 by $e^{j\phi}$ are equivalent to the codebooks before the change, wherein $\phi$ is any non-zero real number.

Figure 5:
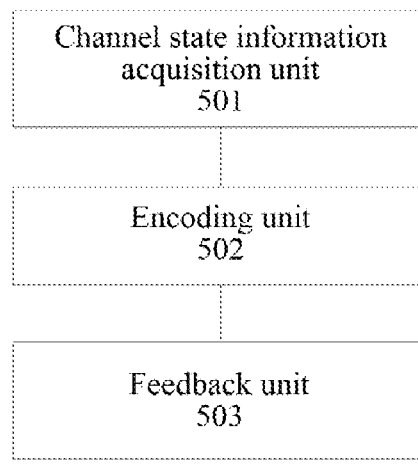
FIG. 5 is a block diagram of a terminal according to an embodiment of the present invention.

The embodiments of the present invention further provide a terminal, as shown in FIG. 5, comprising:

a channel state information acquisition unit 501, configured to acquire channel state information, the channel state information comprising a first class of Precoding Matrix Indicator (PMI1) information and Rank Indicator (RI) information;

an encoding unit 502, configured to perform joint encoding on the PMI1 information and the RI information into a 4-bit or 5-bit feedback report, wherein the feedback report is used for indicating one of a set of combination information formed by the RI information and the PMI1 information, and the set of combination information at least comprises one of:
combination information of RI=1 with M1 PMI1 respectively;
combination information of RI=2 with M2 PMI1 respectively;
combination information of RI=3 with one PMI1;
combination information of RI=4 with one PMI1;
wherein M1=M2=8, or M1=M2=4, or M1=16 and M2=8, or M1=8 and M2=16, or M1=16 and M2=4, or M1=4 and M2=16, or M1=8 and M2=4, or M1=4 and M2=8; and a feedback unit 503, configured to feed back the feedback report in a physical uplink control channel.

Figure 6:
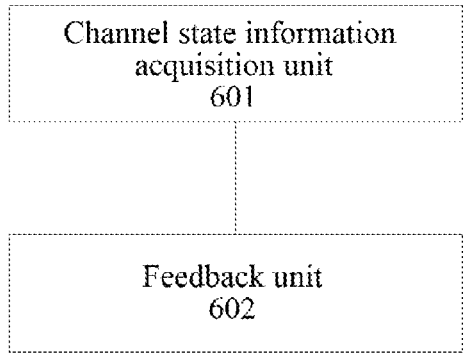
FIG. 6 is a block diagram of a terminal according to an embodiment of the present invention.

The embodiments of the present invention further provide a terminal, as shown in FIG. 6, comprising:

a channel state information acquisition unit 601, configured to acquire channel state information, the channel state information comprising Rank Indicator (RI) information, a second class of Precoding Matrix Indicator (PMI2) information, subband indication information and channel quality information; and a feedback unit 602, configured to feed back the channel state information in a physical uplink control channel, wherein when RI=3 or 4, the PMI2 information comprises 2 bits, and the PMI2 indicates one codeword in a first set of codewords, and the first set of codewords comprises 4 codewords selected from a codebook corresponding to Ranks 3 and 4 in the Rel-8 codebook.

Figure 7:
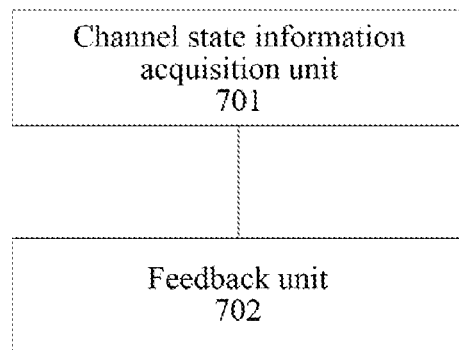
FIG. 7 is a block diagram of a terminal according to an embodiment of the present invention.

The embodiments of the present invention further provide a terminal, as shown in FIG. 7, comprising:

a channel state information acquisition unit 701, configured to acquire channel state information, the channel state information comprising Rank Indicator (RI) information, a second class of Precoding Matrix Indicator (PMI2) information, subband indication information, and channel quality information; and a feedback unit 702, configured to feed back the channel state information in a physical uplink control channel, wherein when RI=1 or 2, the PMI2 information comprises 2 bits, and indicates one codeword in a second set of codewords, and the second set of codewords comprises:

$0^{th}$, $1^{st}$, $2^{nd}$, and 3rd codewords in a codebook corresponding to rank 1 in the Long Term Evolution-Advanced (LTE-A) Rel12 version or a first or second codebook corresponding to rank 2 in the LTE-A Rel12 version; or $0^{th}$, $1^{st}$, $8^{th}$, and $9^{th}$ codewords in a codebook corresponding to rank 1 in the LTE-A Rel12 version or a first or second codebook corresponding to rank 2 in the LTE-A Rel12 version; or $0^{th}$, $4^{th}$, $8^{th}$, and $12^{th}$ codewords in a codebook corresponding to rank 1 in the LTE-A Rel12 version or a first or second codebook corresponding to rank 2 in the LTE-A Rel12 version; or $0^{th}$, $4^{th}$, $5^{th}$, and $12^{th}$ codewords in a codebook corresponding to rank 1 in the LTE-A Rel12 version or a first or second codebook corresponding to rank 2 in the LTE-A Rel12 version; or $0^{th}$, $1^{st}$, $4^{th}$, and $5^{th}$ codewords in a codebook corresponding to rank 1 in the LTE-A Rel12 version or a first or second codebook corresponding to rank 2 in the LTE-A Rel12 version; or $12^{th}$, $13^{th}$, $14^{th}$, and $15^{th}$ codewords in a codebook corresponding to rank 1 in the LTE-A Rel12 version or a first or second codebook corresponding to rank 2 in the LTE-A Rel12 version.

Figure 8:
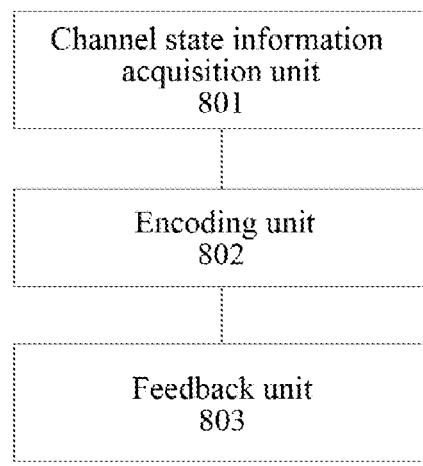
FIG. 8 is a block diagram of a terminal according to an embodiment of the present invention.

The embodiments of the present invention further provide a terminal, as shown in FIG. 8, comprising:

a channel state information acquisition unit 801, configured to acquire channel state information, the channel state information comprising Rank Indicator (RI) information, a first class of Precoding Matrix Indicator (PMI1) information, and a second class of Precoding Matrix Indicator (PMI2) information;

an encoding unit 802, configured to perform joint encoding on the PMI1 information and the PMI2 information into a 4-bit feedback report, wherein the feedback report is used for indicating one of a set of combination information formed by the PMI1 and the PMI2, and codewords indicated by the set of combination information comprise codewords in a codebook corresponding to Rank 1 or a first or second codebook corresponding to Rank 2 in the Long Term Evolution-Advanced (LTE-A) Rel12 version; and a feedback unit 803, configured to feed back the feedback report in a physical uplink control channel.

It should be illustrated that many details described in the above method embodiments may similarly be applied to the apparatus embodiments, and therefore the repeated description of the same or similar parts are omitted.

A person having ordinary skill in the art should understand that all or a part of the steps in the above method can be implemented by programs instructing related hardware, and the programs can be stored in a computer readable storage medium, such as a read-only memory, a disk, or a disc etc. Alternatively, all or a part of the steps in the aforementioned embodiments can also be implemented with one or more integrated circuits. Accordingly, various modules/units in the aforementioned embodiments can be implemented in a form of hardware, or can also be implemented in a form of software functional modules. The present invention is not limited to any particular form of combination of hardware and software.

The above description is merely preferable embodiments of the present invention, instead of limiting the protection scope of the present invention. Any modification, equivalent substitution, improvement etc., which is made within the spirit and principle of the present invention, should be included in the protection scope of the present invention.

INDUSTRIAL APPLICABILITY

The embodiments of the present invention can reduce the overhead of the PMI feedback by joint encoding and can further ensure the accuracy of the PMI feedback with a limited overhead and obtain better precoding performance.

What is claimed is:

1. A method for feeding back channel state information, applied to a 4-antenna system, comprising:

a terminal acquiring channel state information, the channel state information comprising Rank Indicator (RI) information, a second class of Precoding Matrix Indicator (PMI2) information, subband indication information and channel quality information; and the terminal feeding back the channel state information in a physical uplink control channel, wherein when RI=3 or 4, the PMI2 information comprises 2 bits, and the PMI2 indicates one codeword in a first set of codewords, and the first set of codewords comprises 4 codewords selected from a codebook corresponding to Ranks 3 and 4 in a Rel-8 codebook, wherein the Rel-8 codebook refers to the codebook defined in 3GPP TS 36.211 V8.9.0;

wherein the first set of codewords comprises:

using $0^{th}$, $1^{st}$, $2^{nd}$, and $3^{rd}$ codewords of the codebook corresponding to Ranks 3 and 4 in the Rel-8 codebook as a first group, using $8^{th}$, $9^{th}$, $10^{th}$, and $11^{th}$ codewords of the codebook corresponding to Ranks 3 and 4 in the Rel-8 codebook as a second group, selecting 2 codewords from the first group and putting the 2 codewords in the first set of codewords, and selecting 2 codewords from the second group and putting the 2 codewords in the first set of codewords;

or using $0^{th}$, $2^{nd}$, $8^{th}$, and $10^{th}$ codewords of the codebook corresponding to Ranks 3 and 4 in the Rel-8 codebook as a third group, using $1^{st}$, $3^{rd}$, $9^{th}$, and $11^{th}$ codewords of the codebook corresponding to Ranks 3 and 4 in the Rel-8 codebook as a fourth group, selecting 2 codewords from the third group and putting the 2 codewords in the first set of codewords, and selecting 2 codewords from the fourth group and putting the 2 codewords in the first set of codewords;

or using $0^{th}$, $2^{nd}$, $3^{rd}$, and $10^{th}$ codewords of the codebook corresponding to Ranks 3 and 4 in the Rel-8 codebook as a fifth group, using $2^{nd}$, $8^{th}$, $9^{th}$, and $11^{th}$ codewords of the codebook corresponding to Ranks 3 and 4 in the Rel-8 codebook as a sixth group, selecting 2 codewords from the fifth group and putting the 2 codewords in the first set of codewords, and selecting 2 codewords from the sixth group and putting the 2 codewords in the first set of codewords;

or using $0^{th}$, $1^{st}$, $2^{nd}$, and $9^{th}$ codewords of the codebook corresponding to Ranks 3 and 4 in the Rel-8 codebook as a seventh group, using $3^{rd}$, $10^{th}$, $8^{th}$, and $11^{th}$ codewords of the codebook corresponding to Ranks 3 and 4 in the Rel-8 codebook as an eighth group, selecting 2 codewords from the seventh group and putting the 2 codewords in the first set of codewords, and selecting 2 codewords from the eighth group and putting the 2 codewords in the first set of codewords.

2. A method for feeding back channel state information, comprising:

a terminal acquiring channel state information, the channel state information comprising Rank Indicator (RI) information, a second class of Precoding Matrix Indicator (PMI2) information, subband indication information and channel quality information;

the terminal feeding back the channel state information in a physical uplink control channel, wherein when RI=1 or 2, the PMI2 information is 2 bits, and indicates one codeword in a second set of codewords, and the second set of codewords consists of:

$0^{th}$, $1^{st}$, $4^{th}$, and $5^{th}$ codewords in a codebook corresponding to rank 1 in an LTE-A Rel12 version or $0^{th}$, $1^{st}$, $4^{th}$, and $5^{th}$ codewords in a first or second codebook corresponding to rank 2 in the LTE-A Rel12 version, wherein the LTE-A Rel12 version refers to 3GPP TS 36.213 V12.0.0; wherein the method is applied to a system having only 4 downlink antenna ports.

3. A method for feeding back channel state information, applied to a 4-antenna system, comprising:

a terminal acquiring channel state information, the channel state information comprising Rank Indicator (RI) information, a first class of Precoding Matrix Indicator (PMI1) information and a second class of Precoding Matrix Indicator (PMI2) information;

the terminal performing joint encoding on the PMI1 information and the PMI2 information into a 4-bit feedback report;

the terminal feeding back the feedback report in a physical uplink control channel; wherein the feedback report is used for indicating one of a set of combination information formed by the PMI1 and the PMI2, and codewords indicated by the set of combination information comprise codewords in a codebook corresponding to Rank 1 or a first or second codebook corresponding to Rank 2 in a Long Term Evolution-Advanced (LTE-A) Rel12 version, wherein the LTE-A Rel12 version refers to 3GPP TS 36.213 V12.0.0;

wherein when RI=1, the codewords indicated by the set of combination information comprise codewords in the codebook corresponding to Rank 1 in the LTE-A Rel12 version, and the codewords indicated by the set of combination information meet:

a model $$\begin{bmatrix} u \\ e^{j\frac{m\pi}{4}} \cdot e^{j\frac{n\pi}{2}} \cdot u \end{bmatrix} m = 0, 1 \quad n = 0, 1, 2, 3,$$

wherein u is a 2-dimensional column vector;

or when RI=2, the codewords indicated by the set of combination information comprise codewords of a first codebook corresponding to Rank 2 in the LTE-A Rel12 version, and the codewords indicated by the set of combination information meet a model $$\begin{bmatrix} u_{i_1} & u_{i_2} \\ e^{j\theta_m}u_{i_1} & -e^{j\theta_m}u_{i_2} \end{bmatrix} i_1, i_2, m = 0 \sim 15,$$

wherein $\theta_m$ is any real number, and $u_i$ is a 2-dimensional column vector.

4. The method according to claim 3, wherein all of the codewords indicated by the set of combination information meet m=0; or one half of the codewords indicated by the set of combination information meet the model when m=0, and the other half of the codewords indicated by the set of combination information meet the model when m=1; or all of the codewords indicated by the set of combination information meet m=1.

5. The method according to claim 3, wherein a set of codewords indicated by the set of combination information is:

$$\begin{bmatrix} u_i \\ e^{j\theta_i}u_i \end{bmatrix} i = 0 \sim 15,$$

wherein $\theta_i$ is any real number, and $u_i$ is a 2-dimensional column vector.

6. A terminal, comprising:

a channel state information acquisition unit, configured to acquire channel state information, the channel state information comprising Rank Indicator (RI) information, a second class of Precoding Matrix Indicator (PMI2) information, subband indication information and channel quality information; and a feedback unit, configured to feed back the channel state information in a physical uplink control channel, wherein when RI=3 or 4, the PMI2 information comprises 2 bits, the PMI2 indicates one codeword in a first set of codewords, and the first set of codewords comprises 4 codewords selected from a codebook corresponding to Ranks 3 and 4 in a Rel-8 codebook, wherein the Rel-8 codebook refers to the codebook defined in 3GPP TS 36.211 V8.9.0;

wherein the first set of codewords comprises:

using $0^{th}$, $1^{st}$, $2^{nd}$, and $3^{rd}$ codewords of the codebook corresponding to Ranks 3 and 4 in the Rel-8 codebook as a first group, using $8^{th}$, $9^{th}$, $10^{th}$, and $11^{th}$ codewords of the codebook corresponding to Ranks 3 and 4 in the Rel-8 codebook as a second group, selecting 2 codewords from the first group and putting the 2 codewords in the first set of codewords, and selecting 2 codewords from the second group and putting the 2 codewords in the first set of codewords;

or using $0^{th}$, $2^{nd}$, $8^{th}$, and $10^{th}$ codewords of the codebook corresponding to Ranks 3 and 4 in the Rel-8 codebook as a third group, using $1^{st}$, $3^{rd}$, $9^{th}$, and $11^{th}$ codewords of the codebook corresponding to Ranks 3 and 4 in the Rel-8 codebook as a fourth group, selecting 2 codewords from the third group and putting the 2 codewords in the first set of codewords, and selecting 2 codewords from the fourth group and putting the 2 codewords in the first set of codewords;

or using $0^{th}$, $2^{nd}$, $3^{rd}$, and $10^{th}$ codewords of the codebook corresponding to Ranks 3 and 4 in the Rel-8 codebook as a fifth group, using $2^{nd}$, $8^{th}$, $9^{th}$, and $11^{th}$ codewords of the codebook corresponding to Ranks 3 and 4 in the Rel-8 codebook as a sixth group, selecting 2 codewords from the fifth group and putting the 2 codewords in the first set of codewords, and selecting 2 codewords from the sixth group and putting the 2 codewords in the first set of codewords;

or using $0^{th}$, $1^{st}$, $2^{nd}$, and $9^{th}$ codewords of the codebook corresponding to Ranks 3 and 4 in the Rel-8 codebook as a seventh group, using $3^{rd}$, $10^{th}$, $8^{th}$, and $11^{th}$ codewords of the codebook corresponding to Ranks 3 and 4 in the Rel-8 codebook as an eighth group, selecting 2 codewords from the seventh group and putting the 2 codewords in the first set of codewords, and selecting 2 codewords from the eighth group and putting the 2 codewords in the first set of codewords.

7. A terminal, comprising:
a channel state information acquisition unit, configured to acquire channel state information, the channel state information comprising Rank Indicator (RI) information, a second class of Precoding Matrix Indicator (PMI2) information, subband indication information and channel quality information; and
a feedback unit, configured to feed back the channel state information in a physical uplink control channel, wherein, when RI=1 or 2, the PMI2 information is 2 bits, and indicates one codeword in a second set of codewords, and the second set of codewords consists of:
$0^{th}$, $1^{st}$, $4^{th}$, and $5^{th}$ codewords in a codebook corresponding to rank 1 in an LTE-A Rel12 version or $0^{th}$, $1^{st}$, $4^{th}$, and $5^{th}$ codewords in a first or second codebook corresponding to rank 2 in the LTE-A Rel12 version, wherein the LTE-A Rel12 version refers to 3GPP TS 36.213 V12.0.0; wherein the terminal feeds back the channel state information to a system having only 4 downlink antenna ports.

8. A terminal, comprising:
a channel state information acquisition unit, configured to acquire channel state information, the channel state information comprising Rank Indicator (RI) information, a first class of Precoding Matrix Indicator (PMI1) information and a second class of Precoding Matrix Indicator (PMI2) information;
an encoding unit, configured to perform joint encoding on the PMI1 information and the PMI2 information into a 4-bit feedback report, wherein
the feedback report is used for indicating one of a set of combination information formed by the PMI1 and the PMI2, and codewords indicated by the set of combination information comprise codewords in a codebook corresponding to Rank 1 or a first or second codebook corresponding to Rank 2 in a Long Term Evolution-Advanced (LTE-A) Rel12 version, wherein the LTE-A Rel12 version refers to 3GPP TS 36.213 V12.0.0; and
a feedback unit, configured to feed back the feedback report in a physical uplink control channel;
wherein when the RI=1, the codewords indicated by the set of combination information comprise codewords in the codebook corresponding to Rank 1 in the LTE-A Rel12 version, and the codewords indicated by the set of combination information meet:
a model $$\begin{bmatrix} u \\ e^{j\frac{m\pi}{4}} \cdot e^{j\frac{n\pi}{2}} \cdot u \end{bmatrix} m = 0,1 \; n = 0,1,2,3,$$

wherein u is a 2-dimensional column vector;
or
wherein when RI=2, codewords indicated by the set of combination information comprise codewords of a first codebook corresponding to Rank 2 in the LTE-A Rel12 version, and the codewords indicated by the set of combination information meet a model $$\begin{bmatrix} u_{i_1} & u_{i_2} \\ e^{j\theta_m}u_{i_1} & -e^{j\theta_m}u_{i_2} \end{bmatrix} i_1, i_2, m = 0 \sim 15,$$

wherein $\theta_m$ is any real number, and $u_i$ is a 2-dimensional column vector.

9. The terminal according to claim 8, wherein
all of the codewords indicated by the set of combination information meet m=0; or
one half of the codewords indicated by the set of combination information meet the model when m=0, and the other half of the codewords indicated by the set of combination information meet the model when m=1; or
all of the codewords indicated by the set of combination information meet m=1.

10. The terminal according to claim 8, wherein a set of codewords indicated by the set of combination information is:

$$\begin{bmatrix} u_i \\ e^{j\theta_i}u_i \end{bmatrix} i = 0 \sim 15,$$

wherein $\theta_i$ is any real number, and $u_i$ is a 2-dimensional column vector.

11. The method according to claim 5, wherein
the $$u_i \in \left\{ \begin{bmatrix}1\\1\end{bmatrix}\begin{bmatrix}1\\e^{j\frac{\pi}{4}}\end{bmatrix}\begin{bmatrix}1\\j\end{bmatrix}\begin{bmatrix}1\\e^{j\frac{3\pi}{4}}\end{bmatrix}\begin{bmatrix}1\\-1\end{bmatrix}\begin{bmatrix}1\\e^{j\frac{5\pi}{4}}\end{bmatrix}\begin{bmatrix}1\\-j\end{bmatrix}\begin{bmatrix}1\\e^{j\frac{7\pi}{4}}\end{bmatrix} \right\},$$

wherein in $\{u_i, i=0\sim15\}$, 2 values are $$\begin{bmatrix}1\\1\end{bmatrix},$$

2 values are $$\begin{bmatrix}1\\e^{j\frac{\pi}{4}}\end{bmatrix},$$

2 values are $$\begin{bmatrix}1\\j\end{bmatrix},$$

2 values are $$\begin{bmatrix}1\\e^{j\frac{3\pi}{4}}\end{bmatrix},$$

2 values are $$\begin{bmatrix}1\\-1\end{bmatrix},$$

2 values are $$\begin{bmatrix} 1 \\ e^{j\frac{5\pi}{4}} \end{bmatrix},$$

2 values are $$\begin{bmatrix} 1 \\ -j \end{bmatrix},$$

and 2 values are $$\begin{bmatrix} 1 \\ e^{j\frac{7\pi}{4}} \end{bmatrix}.$$

12. The method according to claim 3, wherein
for all the $i_1$ and $i_2$, $i_1=i_2$; or in the codewords, one half of the codewords meet $i_2=i_1$, and the other half of the codewords meet $i_2 \neq i_1$;
or $$u_{i_1}, u_{i_2} \in \left\{ \begin{bmatrix} 1 \\ 1 \end{bmatrix} \begin{bmatrix} 1 \\ e^{j\frac{\pi}{4}} \end{bmatrix} \begin{bmatrix} 1 \\ j \end{bmatrix} \begin{bmatrix} 1 \\ e^{j\frac{3\pi}{4}} \end{bmatrix} \begin{bmatrix} 1 \\ -1 \end{bmatrix} \begin{bmatrix} 1 \\ e^{j\frac{5\pi}{4}} \end{bmatrix} \begin{bmatrix} 1 \\ -j \end{bmatrix} \begin{bmatrix} 1 \\ e^{j\frac{7\pi}{4}} \end{bmatrix} \right\},$$

wherein in $\{u_{i_1}, u_{i_2}, i=0 \sim 15\}$, 2 values of $u_{i_1}, u_{i_2}$ are $$\begin{bmatrix} 1 \\ 1 \end{bmatrix},$$

2 values of $u_{i_1}, u_{i_2}$ are $$\begin{bmatrix} 1 \\ e^{j\frac{\pi}{4}} \end{bmatrix},$$

2 values of $u_{i_1}, u_{i_2}$ are $$\begin{bmatrix} 1 \\ j \end{bmatrix},$$

2 values of $u_{i_1}, u_{i_2}$ are $$\begin{bmatrix} 1 \\ e^{j\frac{3\pi}{4}} \end{bmatrix},$$

2 values of $u_{i_1}, u_{i_2}$ are $$\begin{bmatrix} 1 \\ -1 \end{bmatrix},$$

2 values of $u_{i_1}, u_{i_2}$ are $$\begin{bmatrix} 1 \\ e^{j\frac{5\pi}{4}} \end{bmatrix},$$

2 values of $u_{i_1}, u_{i_2}$ are $$\begin{bmatrix} 1 \\ -j \end{bmatrix},$$

and 2 values of $u_{i_1}, u_{i_2}$ are $$\begin{bmatrix} 1 \\ e^{j\frac{7\pi}{4}} \end{bmatrix}$$

respectively;
or
when RI=2, codewords indicated by the set of combination information comprise codewords of a second codebook corresponding to Rank 2 in the LTE-A Rel12 version, and the codewords indicated by the set of combination information meet a model $$\begin{bmatrix} u_{i_1} & u_{i_3} \\ e^{j\theta_m} u_{i_2} & e^{j\theta_n} u_{i_4} \end{bmatrix} i_1, i_2, i_3, i_4, m, n = 0 \sim 15,$$

wherein $\theta_m, \theta_n$ are any real numbers, and $u_i$ is a 2-dimensional column vector, wherein the $u_{i_1}, u_{i_2}, u_{i_3}, u_{i_4}$ meet $i_2=i_1=i_4=i_3$.

13. The terminal according to claim 10, wherein $$u_i \in \left\{ \begin{bmatrix} 1 \\ 1 \end{bmatrix} \begin{bmatrix} 1 \\ e^{j\frac{\pi}{4}} \end{bmatrix} \begin{bmatrix} 1 \\ j \end{bmatrix} \begin{bmatrix} 1 \\ e^{j\frac{3\pi}{4}} \end{bmatrix} \begin{bmatrix} 1 \\ -1 \end{bmatrix} \begin{bmatrix} 1 \\ e^{j\frac{5\pi}{4}} \end{bmatrix} \begin{bmatrix} 1 \\ -j \end{bmatrix} \begin{bmatrix} 1 \\ e^{j\frac{7\pi}{4}} \end{bmatrix} \right\},$$

wherein in $\{u_i, i=0 \sim 15\}$, 2 values are $$\begin{bmatrix} 1 \\ 1 \end{bmatrix},$$

2 values are $$\begin{bmatrix} 1 \\ e^{j\frac{\pi}{4}} \end{bmatrix},$$

2 values are $$\begin{bmatrix} 1 \\ j \end{bmatrix},$$

2 values are $$\begin{bmatrix} 1 \\ e^{j\frac{3\pi}{4}} \end{bmatrix},$$

2 values are $$\begin{bmatrix} 1 \\ -1 \end{bmatrix},$$

2 values are $$\begin{bmatrix} 1 \\ e^{j\frac{5\pi}{4}} \end{bmatrix},$$

2 values are $$\begin{bmatrix} 1 \\ -j \end{bmatrix},$$

and 2 values are $$\begin{bmatrix} 1 \\ e^{j\frac{7\pi}{4}} \end{bmatrix}.$$

14. The terminal according to claim 8, wherein
for all the $i_1$ and $i_2$, $i_1=i_2$ or in the codewords, one half of the codewords meet $i_2=i_1$, and the other half of the codewords meet $i_2 \ne i_1$;
or
the $$u_{i_1}, u_{i_2} \in \left\{ \begin{bmatrix} 1 \\ 1 \end{bmatrix} \begin{bmatrix} 1 \\ e^{j\frac{\pi}{4}} \end{bmatrix} \begin{bmatrix} 1 \\ j \end{bmatrix} \begin{bmatrix} 1 \\ e^{j\frac{3\pi}{4}} \end{bmatrix} \begin{bmatrix} 1 \\ -1 \end{bmatrix} \begin{bmatrix} 1 \\ e^{j\frac{5\pi}{4}} \end{bmatrix} \begin{bmatrix} 1 \\ -j \end{bmatrix} \begin{bmatrix} 1 \\ e^{j\frac{7\pi}{4}} \end{bmatrix} \right\},$$

wherein in $\{u_{i_1}, u_{i_2}, i=0\sim 15\}$, 2 values of $u_{i_1}, u_{i_2}$ are $$\begin{bmatrix} 1 \\ 1 \end{bmatrix},$$

2 values of $u_{i_1}, u_{i_2}$ are $$\begin{bmatrix} 1 \\ e^{j\frac{\pi}{4}} \end{bmatrix},$$

2 values of $u_{i_1}, u_{i_2}$ are $$\begin{bmatrix} 1 \\ j \end{bmatrix},$$

2 values of $u_{i_1}, u_{i_2}$ are $$\begin{bmatrix} 1 \\ e^{j\frac{3\pi}{4}} \end{bmatrix},$$

2 values of $u_{i_1}, u_{i_2}$ are $$\begin{bmatrix} 1 \\ -1 \end{bmatrix},$$

2 values of $u_{i_1}, u_{i_2}$ are $$\begin{bmatrix} 1 \\ e^{j\frac{5\pi}{4}} \end{bmatrix},$$

2 values of $u_{i_1}, u_{i_2}$ are $$\begin{bmatrix} 1 \\ -j \end{bmatrix},$$

and 2 values of $u_{i_1}, u_{i_2}$ are $$\begin{bmatrix} 1 \\ e^{j\frac{7\pi}{4}} \end{bmatrix}$$

respectively;
or
when the RI=2, codewords indicated by the set of combination information comprise codewords of a second codebook corresponding to Rank 2 in the LTE-A Rel12 version, and the codewords indicated by the set of combination information meet a model $$\begin{bmatrix} u_{i_1} & u_{i_3} \\ e^{j\theta_m} u_{i_2} & e^{j\theta_n} u_{i_4} \end{bmatrix}$$

$i_1, i_2, i_3, i_4, m, n = 0 \sim 15$, wherein $\theta_m, \theta_n$ are any real numbers, and $u_i$ is a 2-dimensional column vector, wherein the $u_{i_1}, u_{i_2}, u_{i_3}, u_{i_4}$ meet $i_2=i_1=i_4=i_3$.

* * * * *